US011236901B2

(12) United States Patent
Holliger et al.

(10) Patent No.: US 11,236,901 B2
(45) Date of Patent: Feb. 1, 2022

(54) TRELLIS LIGHTING APPARATUS, SYSTEM, AND METHOD OF USE

(71) Applicant: Luminet, LLC, Kansas City, MO (US)

(72) Inventors: Eric Gregory Young Holliger, Denver, CO (US); Alice Stover Mayfield, Denver, CO (US); Philip Graham Rowe, Denver, CO (US); Dusty Raymond Terry, Denver, CO (US)

(73) Assignee: Luminet, LLC, Kansas City, MO (US)

( * ) Notice: Subject to any disclaimer, the term of this patent is extended or adjusted under 35 U.S.C. 154(b) by 0 days.

(21) Appl. No.: 17/352,807

(22) Filed: Jun. 21, 2021

(65) Prior Publication Data

US 2021/0310648 A1     Oct. 7, 2021

Related U.S. Application Data

(62) Division of application No. 17/025,274, filed on Sep. 18, 2020, now Pat. No. 11,073,276.

(Continued)

(51) Int. Cl.
| | |
|---|---|
| *F21V 33/00* | (2006.01) |
| *F21S 4/28* | (2016.01) |
| *F21V 29/74* | (2015.01) |
| *F21V 29/77* | (2015.01) |
| *F21V 17/16* | (2006.01) |
| *F24F 13/078* | (2006.01) |
| *F21V 31/00* | (2006.01) |

(Continued)

(52) U.S. Cl.
CPC .............. *F21V 33/006* (2013.01); *F21S 4/28* (2016.01); *F21V 17/164* (2013.01); *F21V 29/745* (2015.01); *F21V 29/777* (2015.01); *F21V 31/00* (2013.01); *F24F 13/078* (2013.01); *F21W 2131/109* (2013.01); *F21Y 2103/20* (2016.08); *F21Y 2115/10* (2016.08)

(58) Field of Classification Search
None
See application file for complete search history.

(56) References Cited

U.S. PATENT DOCUMENTS

| | | | |
|---|---|---|---|
| 7,434,964 B1 * | 10/2008 | Zheng | F21K 9/232 |
| | | | 362/294 |
| 8,092,054 B2 * | 1/2012 | Liu | F21V 29/89 |
| | | | 362/373 |

(Continued)

FOREIGN PATENT DOCUMENTS

| | | | | |
|---|---|---|---|---|
| DE | 202012103495 U1 * | 1/2013 | .............. | F21V 29/83 |

*Primary Examiner* — Britt D Hanley
(74) *Attorney, Agent, or Firm* — Polsinelli PC

(57) ABSTRACT

A heat sink for use in a lighting assembly and including a hexagonal body extending a length. The body including an outer surface, an inner surface opposite the outer surface, a lumen defined by the inner surface, at least one hole extending through the hexagonal body from the inner surface to the outer surface, first, second, third, fourth, fifth, and sixth body portions extending the length. The first, second, and third body portions including planar surfaces extending the length. Each of the first, second, and third body portions configured to support an LED strip thereon. The fourth, fifth, and sixth body portions including fins extending outward therefrom. The inner surface including a plurality of fins extending inward and positioned around a perimeter thereof.

18 Claims, 17 Drawing Sheets

Related U.S. Application Data

(60) Provisional application No. 63/069,410, filed on Aug. 24, 2020, provisional application No. 63/004,705, filed on Apr. 3, 2020, provisional application No. 62/934,118, filed on Nov. 12, 2019.

(51) Int. Cl.
  *F21Y 103/20* (2016.01)
  *F21Y 115/10* (2016.01)
  *F21W 131/109* (2006.01)

(56) References Cited

U.S. PATENT DOCUMENTS

| | | | |
|---|---|---|---|
| 8,979,331 B2* | 3/2015 | Lee | F21V 29/717 |
| | | | 362/373 |
| 9,080,733 B2* | 7/2015 | Rowley | F21K 9/232 |
| 10,788,163 B2* | 9/2020 | Ramaiah | F21V 29/83 |
| 10,865,974 B2* | 12/2020 | Duan | F21V 17/104 |
| 11,092,325 B2* | 8/2021 | Dassanayake | F21K 9/62 |
| 2003/0230765 A1* | 12/2003 | Dry | F21V 29/75 |
| | | | 257/200 |
| 2009/0016072 A1* | 1/2009 | Lee | F21V 29/767 |
| | | | 362/373 |
| 2009/0323325 A1* | 12/2009 | Long | F21V 29/83 |
| | | | 362/234 |
| 2011/0156584 A1* | 6/2011 | Kim | F21K 9/232 |
| | | | 315/32 |
| 2012/0201023 A1* | 8/2012 | Yoneda | F21V 29/763 |
| | | | 362/218 |
| 2012/0300441 A1* | 11/2012 | Thomas | F21V 29/76 |
| | | | 362/184 |
| 2014/0376218 A1* | 12/2014 | Ni | F21S 4/28 |
| | | | 362/217.14 |
| 2017/0146226 A1* | 5/2017 | Storey | F21V 29/56 |
| 2020/0088396 A1* | 3/2020 | Duan | F21V 17/104 |
| 2021/0116081 A1* | 4/2021 | Liu | F21V 17/164 |

* cited by examiner

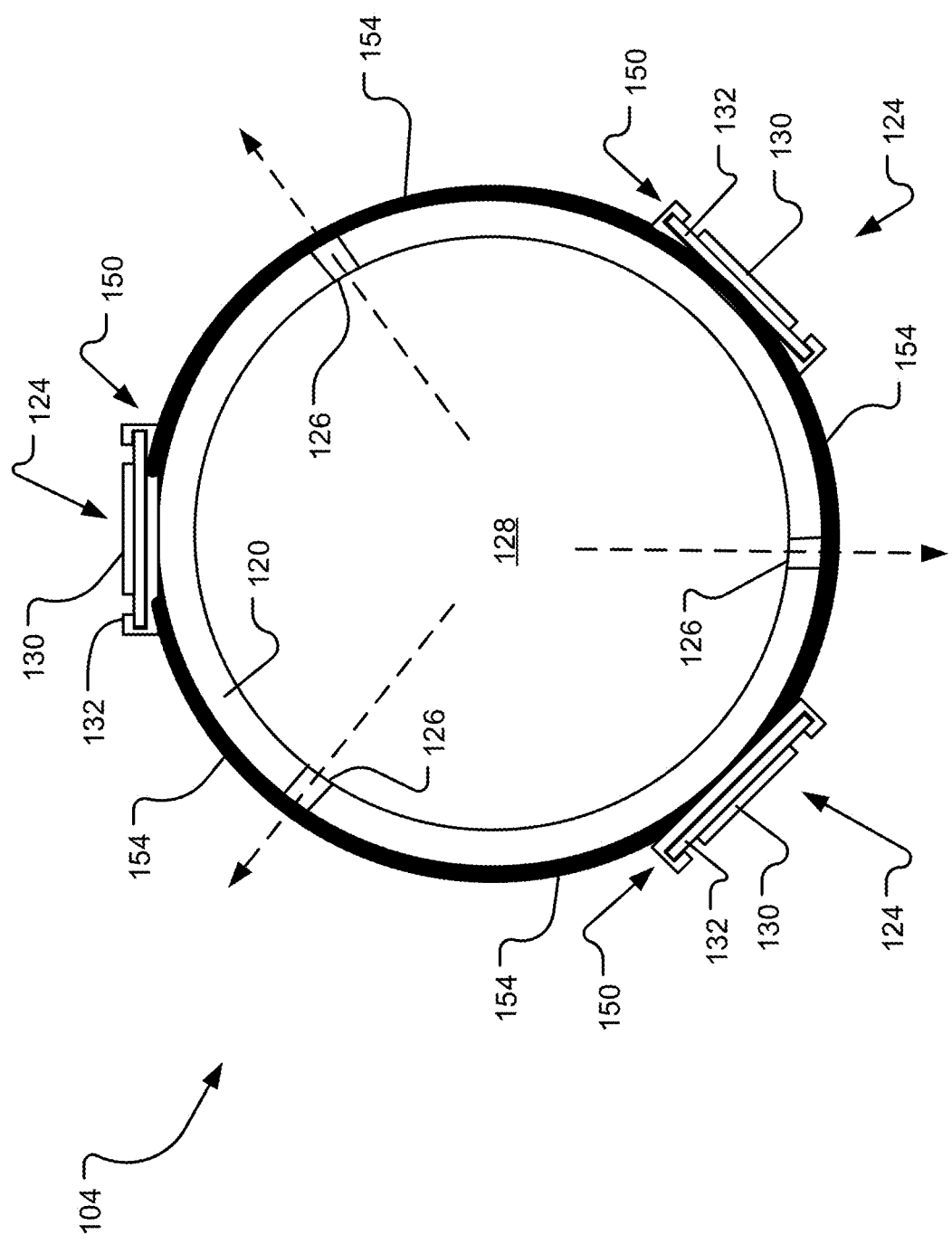

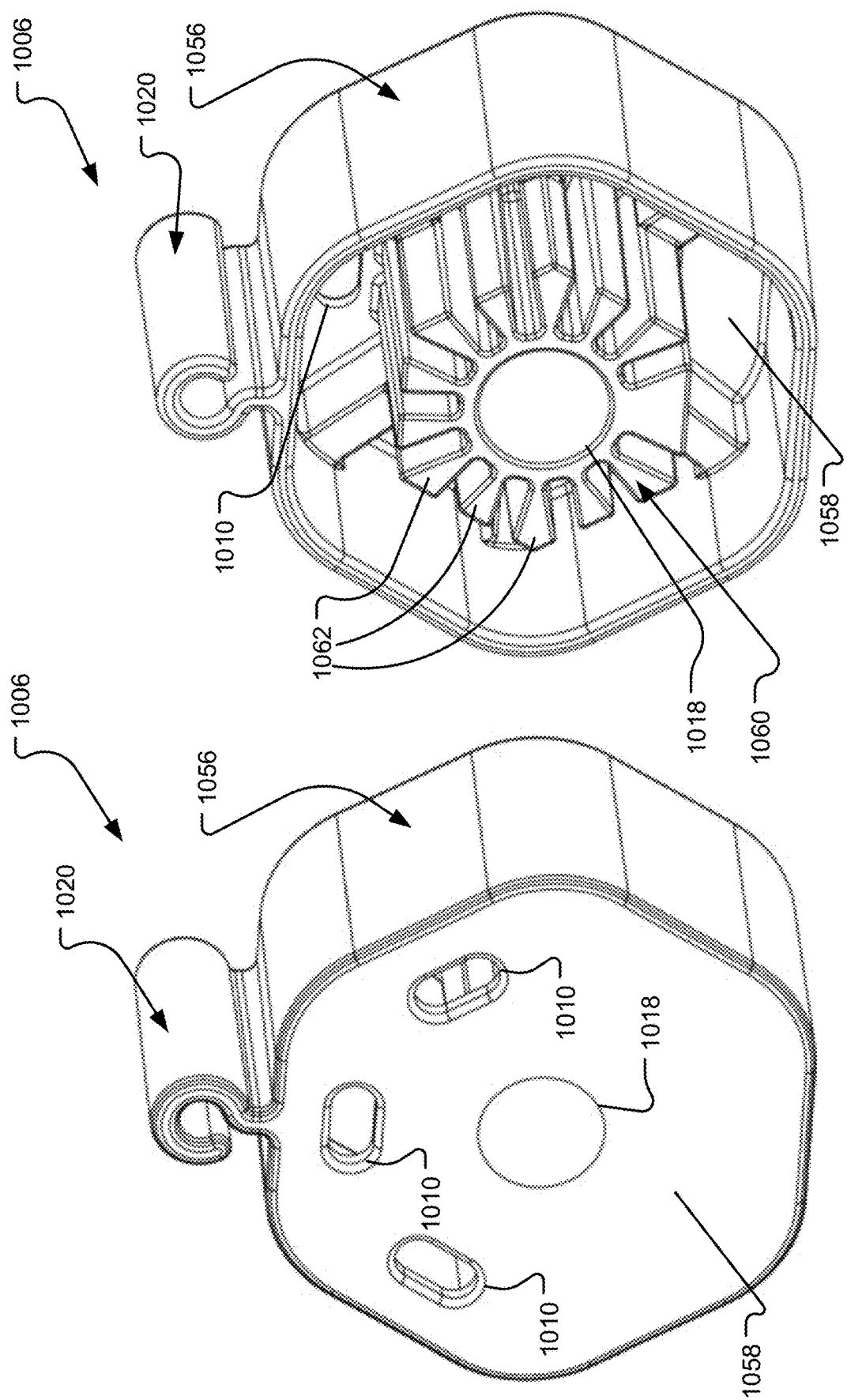

TRELLIS LIGHTING APPARATUS, SYSTEM, AND METHOD OF USE

CROSS-REFERENCE TO RELATED APPLICATIONS

This application is a divisional application of U.S. application Ser. No. 17/025,274 filed Sep. 18, 2020, which application claims the benefit of U.S. Provisional Application No. 62/934,118, filed Nov. 12, 2019, U.S. Provisional Application No. 63/004,705, filed Apr. 3, 2020, and U.S. Provisional Application No. 63/069,410, filed Aug. 24, 2020, all of which are hereby incorporated by reference in their entireties.

FIELD OF THE INVENTION

The present disclosure is directed to a trellis lighting apparatus, system, and method of use. More specifically, the present disclosure is directed to an intra-canopy trellis lighting system for supporting and lighting one or more plants.

BACKGROUND OF THE INVENTION

Indoor agricultural facilities such as cannabis cultivation facilities rely on overhead lighting systems for lighting the plants. Conventionally, the lighting systems are hung above the plants and are raised up as the plants grow. As plants grow and mature, the leaves and flowers extend up and outward. And as a result, less and less light reaches the inner leaves and flowers within the canopy.

Accordingly, there is a need in the art for lighting systems that can support plants and provide intra-canopy lighting without harming (e.g., burning) the plants and flowers. With these thoughts in mind, aspects of the trellis lighting apparatus, system, and method were developed.

SUMMARY

Aspects of the present disclosure may involve a trellis lighting system having at least one light emitting diode (LED) assembly having a hollow tube including a length, a sidewall, an inner surface, an outer surface, and a lumen extending through the hollow tube. The LED assembly further includes a core element positioned within the lumen of the tube and extending a portion of the length. The LED assembly further includes at least one LED strip positioned within the lumen of the hollow tube and coupled to the core element so as to dissipate heat generated by the at least one LED strip.

Aspects of the present disclosure may include a trellis lighting system that includes at least one lighting and support assembly. The at least one lighting and support may include a cover, a heat sink, and at least one light emitting diode (LED) strip. The cover permitting light to pass there through and including a body extending a first length and bounded by first longitudinal edge, a second longitudinal edge opposite the first longitudinal edge, a first side edge, a second side edge opposite the first side edge, an inner surface, and an outer surface opposite the inner surface. The heat sink is configured to couple to the cover and may include a body extending a second length. The body may include an outer surface, an inner surface defining a lumen that extends through the body, a plurality of outer fins coupled to the outer surface, and a plurality of inner fins coupled to the inner surface. The at least one LED strip may be configured to be coupled to the body of the heat sink along the second length thereof so as to dissipate heat generated by the at least one LED strip. In an assembled state of the at least one lighting and support assembly, the at least one LED strip is positioned between the beat sink and the cover, and the plurality of outer fins are uncovered by the cover.

In certain instances, the first side edge transitions to the first longitudinal edge and the second longitudinal edge at a first side thereof, and the second side edge transitions to the first longitudinal edge and the second longitudinal edge at a second side thereof.

In certain instances, the body of the heat sink further includes a plurality of projections configured to contact the cover in the assembled state.

In certain instances, the cover is configured to snap into engagement with at least two of the plurality of projections in order to couple the cover and the heat sink in the assembled state.

In certain instances, the at least one LED strip includes three LED strips, and wherein each of the three LED strips is positioned between two projections of the plurality of projections.

In certain instances, the plurality of projections extend the second length.

In certain instances, the at least one LED strip includes a first, a second, and a third LED strip that are coupled to the body of the heat sink in three different positions, respectively, to direct light in three different directions.

In certain instances, a first angle between the first and the second LED strip as measured from a central point of the lumen of the heat sink is about sixty degrees, and a second angle between the second and the third LED strip as measured from the central point of the lumen of the heat sink is about sixty degrees.

In certain instances, the body of the heat sink includes a hexagonal body portion including at least one planar surface supporting the at least one LED strip. In certain instances, the body of the heat sink includes at least one port extending from the outer surface to the inner surface. In certain instances, the at least one port extends through a pair of the plurality of outer fins. In certain instances, in the assembled state, the at least one port is uncovered by the cover.

In certain instances, the system may include a gas delivery system in fluid communication with the lumen of the body of the heat sink and configured to deliver gas into the lumen of the hollow tube. In certain instances, the gas may include carbon dioxide. In certain instances, the gas may include nitrogen and oxygen.

In certain instances, the at least one lighting and support assembly may include a first and second lighting and support assembly configured to interconnect with each other so as to form a lighted trellis for supporting and lighting one or more plants.

In certain instances, the system may include a connector configured to interconnect the first and second lighting and support assembly, the connector may include a central structure having a first coupling portion and a second coupling portion, the first coupling portion configured to interdigitate with the plurality of inner fins of the body of the heat sink of the first lighting and support assembly, and the second coupling portion configured to interdigitate with the plurality of inner fins of the body of the heat sink of the second lighting and support assembly.

In certain instances, the central body of the connector further includes a through-hole so as to link the lumen of the body of the heat sink of the first lighting and support assembly in fluid communication with the lumen of the body of the heat sink of the second lighting and support assembly when the first and second lighting and support assemblies are interconnected.

In certain instances, the system may include at least one connector configured to interconnect the first and second lighting and support assembly, an end cap configured to enclose a first end of the first and second lighting and support assemblies, and an end plug configured to enclose a first end of the first and second lighting and support assemblies, the end cap may include at least one port configured to pass electrical components there through, and a gas port for coupling of a gas delivery component.

In certain instances, the system may include a connector configured to interconnect the first and second lighting and support assembly, the connector may include a hook configured to be secured by a wire in order to suspend the first and second lighting and support assembly.

In certain instances, the system may include a power supply electrically coupled to the at least one LED strip.

Aspects of the present disclosure may include a method of horticulture of a plant. The method may include at least the following steps. The method may include a step of positioning a lighting strand assembly through an intra-canopy of the plant. In certain instances, the lighting strand assembly may include: at least one LED strip; a heat sink including an outer surface, a plurality of fins extending outward from the outer surface, a lumen extending longitudinally through the heat sink, and a plurality of gas ports extending from the lumen through the heat sink to the outer surface, the at least one LED strip coupled to the outer surface of the heat sink; and a cover coupled to the heat sink and covering the at least one LED strip, the cover not covering the plurality of fins of the heat sink. The method may further include a step of providing light to the intra-canopy of the plant via the at least one LED strip. The method may further include a step of providing fluid flow through the lumen of the heat sink, at least a portion of the fluid flow passing through the plurality of gas ports.

In certain instances, the at least one LED strip may include at least three LED strips oriented to direct light in radially outward directions.

In certain instances, the heat sink may include a body of a hexagonal cross-sectional profile. In certain instances, the heat sink may include a plurality of fins within the lumen.

Aspects of the present disclosure may include a heat sink for use in a lighting assembly. In certain instances, the heat sink may include a hexagonal body extending a length. The body may include an inner surface defining a lumen extending the length, first, second, third, fourth, fifth, and sixth body portions extending the length, the first, second, and third body portions may include planar surfaces extending the length, each of the first, second, and third body portions configured to support an LED strip thereon, the fourth, fifth, and sixth body portions including fins extending outward therefrom, the inner surface including a plurality of fins around a perimeter thereof.

In certain instances, the heat sink may include two protrusions extending at least a portion of the length and positioned on opposite sides of the hexagonal body, the two protrusions configured to couple with a cover configured to permit light from the LED strip to pass there through.

In certain instances, the heat sink may include at least one hole extending from the lumen of the inner surface through the fifth body portion.

In certain instances, the heat sink may include first, second, and third LED strips coupled, respectively to the first, second, and third body portions.

BRIEF DESCRIPTION OF THE DRAWINGS

FIG. 7 is a transverse cross-section of the lighting strand of the trellis lighting system.

FIGS. 14 and 15 are, respectively, outer and inner isometric views of an end cap for coupling to an intake end of the lighting and support assembly.

DETAILED DESCRIPTION

Figure 1:
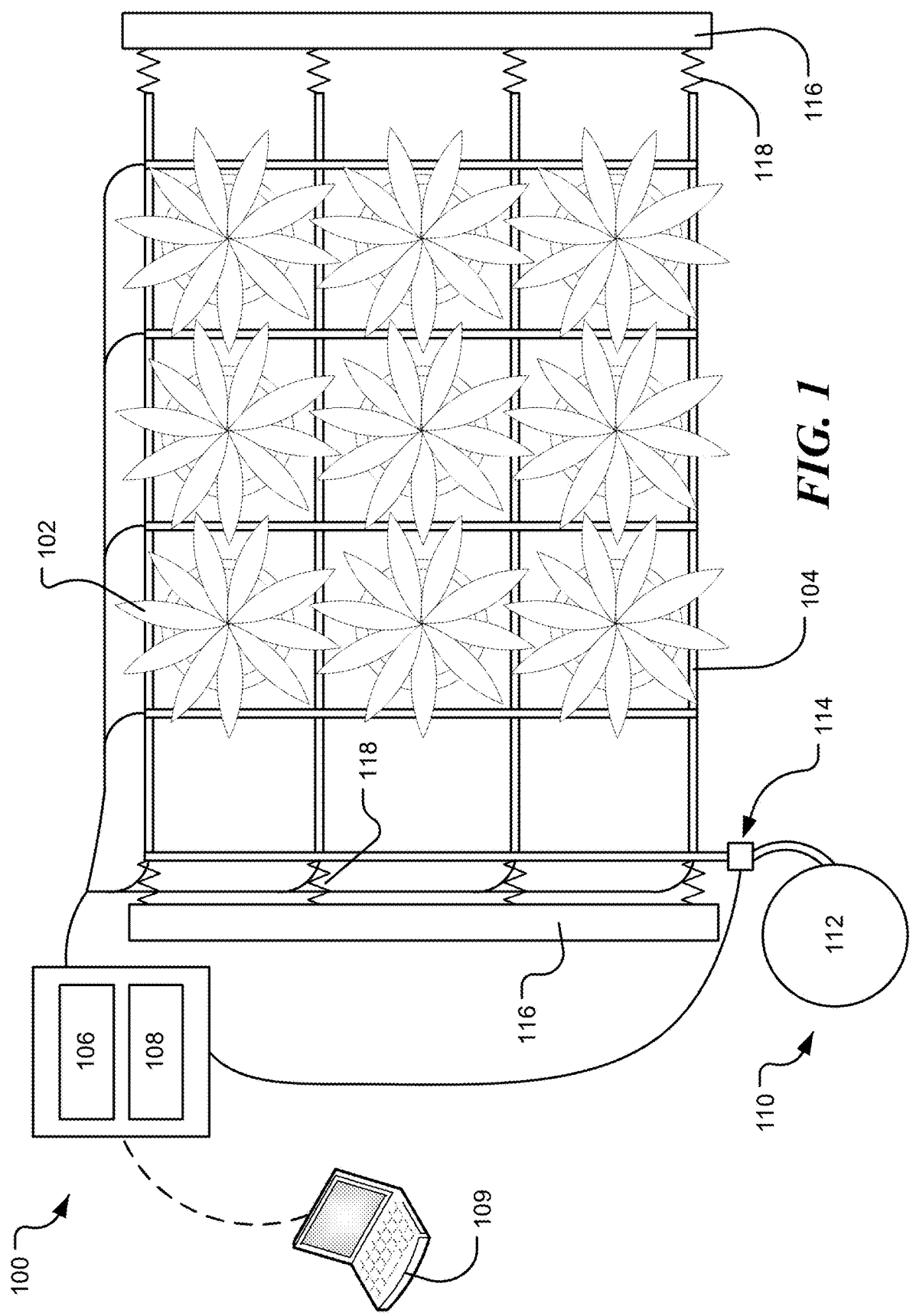
FIG. 1 is an overhead view of a trellis lighting system providing intra-canopy support and lighting for plants in an indoor agricultural setting.

Referring to FIG. 1, the present disclosure describes a trellis lighting system 100 for supporting and lighting one or more plants 102 in a grow facility. More particularly, FIG. 1 illustrates an overhead view of the trellis lighting system 100 providing intra-canopy support and lighting for plants 102 in an indoor grow facility. As seen in FIG. 1, the trellis lighting system 100 may include lighting strands 104, which are also referred to as a lighting and support assembly, arranged in a grid pattern around the plants 102. While FIG. 1 depicts the trellis lighting system 100 used in a horizontal arrangement of plants 102, the system 100 may be used in a vertical grid pattern to aid in the support and lighting of vined plants, such as grapes, among others.

The lighting strands 104 provide the functions of supporting the plants as they grow and mature, lighting the intra-canopy of the plants, and delivering carbon dioxide ($CO_2$) to cool the unit, feed the plants, and kill unwanted pests. The trellis lighting system 100 provides photosynthetically active radiation ("PAR") to poorly lit areas of the plant canopy to increase overall yield. The intra-canopy of the plants may include the normally shaded portion of the plants not fully lighted by conventional down-lighting systems (e.g., overhead lights). That said, the system 100 shown in FIG. 1 does not show an overhead, down-lighting system; but, such a lighting system may be used with the trellis lighting system 100 to provide full lighting to the plants without limitation.

As seen in FIG. 1, the trellis lighting system 100 may also include a power supply 106 electrically connected to the lighting strands 104, a controller 108 in electrical communication with the power supply 106 and the lighting strands 104. The controller is configured to control the operations of the trellis lighting system 100, including facilitating a lighting schedule, brightness and intensities of the light, spectrum of the light, etc. The controller 108 may include or be in communication with a computer 109 connected with a network (e.g., LAN, internet) for setting and operating the lighting schedule and various associated parameters. Other devices and peripherals (e.g., tablets, phones, desktop computers) may be connected through the network for communication with the controller 108 to operate the system 100.

The trellis lighting system 100 may additionally include a gas delivery system 110 in electrical communication with the controller 108 and in fluid communication with the lighting strands 104. The gas delivery system 110 may include a tank 112 housing a gas, such as CO2. The tank 112 may be in fluid communication with a valve 114 controllable (e.g. open/close) by the controller 108. The valve 114 may be in fluid communication with the lighting strands 104 for delivery of the gas throughout the grid. In certain instances, the gas delivery system 110 may include a gas heater (not shown in the figures) for heating the gas prior to delivery into the lighting strands 104. This may, for example, be utilized when the system 100 is used to provide heat or warmth to the plants 102 such as in outdoor use when air temperature is colder than optimal for the plants 102.

As seen in FIG. 1, the lighting strands 104 are adjustably mounted to a suspension structure 116, such as a cable or rigid frame, by tensioners 118. In this way, the weight of the plants 102 on the lighting strands 104 and the weight of the lighting strands 104 themselves are transferred to the suspension structure 116. The height of the suspension structure 116 may be adjusted so as to adjust a height of the lighting strands 104.

The trellis lighting system 100 may additionally include field sensors placed along the system to monitor the plants 102 and/or the system 100 itself. For example, the sensors may sense temperature surrounding the lighting strands 104 to ensure a certain temperature is not exceeded, which would burn the plants 102. As another example, the sensors may be moisture sensors to ensure adequate moisture levels within the plants. The sensors may communicate data to the computer 109 in the system 100 so that the specific parameters associated with the lighting can be modified, if necessary. The system 100 may additionally incorporate UV-C emitters to kill mold, mildew, fungus, bacteria, and viruses. UV-C is a type of ultraviolet energy in the 260-nanometer frequency, and is the most effective frequency as a germicide. Germicidal lamps may be included in the system 100 to improve indoor air quality and kill unwanted microbes or microorganisms.

It is noted that while the trellis lighting system 100 depicts a grid or net of a plurality of lighting strands in FIG. 1, the system 100 may include other configurations of lighting strands 104. In certain instances, the trellis lighting system 100 may include a single lighting strand 104. In certain instances, the trellis lighting system 100 may include rows of lighting strands 104 without lighted cross-strands. That is, the cross-strands may be support structures without lighting capabilities. The cross-strands may or may not include gas delivery capabilities. As an example, the system 100 may include a series of lighting strand 104 runners that are oriented generally parallel to each other. The cross-strands or crossers may be nylon rope that couple or adjustable couple to the lighting strand 104 runners they cross. This provides for adjustability and customization of the system 100.

Figures 2, 3:
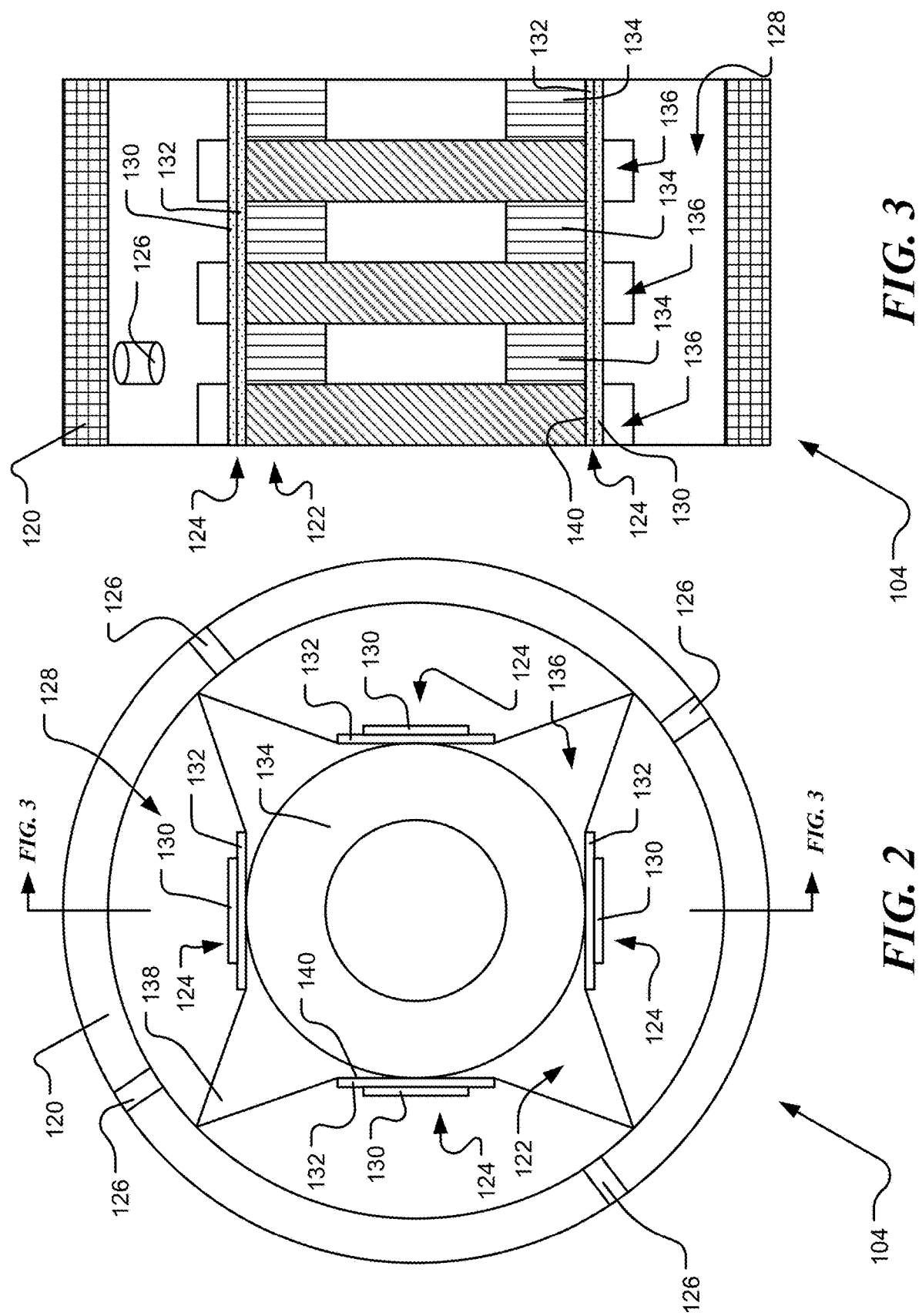
FIG. 2 is a transverse cross-section of a lighting strand of the trellis lighting system.
FIG. 3 is a longitudinal cross-section of a portion of the lighting strand of the trellis lighting system.

FIGS. 2 and 3 illustrate the lighting strand 104 in more detail. More particularly, FIG. 2 depicts a transverse cross-section of the lighting strand 104 of the trellis lighting system 100, and FIG. 3 depicts a longitudinal cross-section of a portion of the lighting strand 104 of the trellis lighting system 100.

As seen in the figures, the lighting strands 104 may include a hollow tube 120 having a lumen 128 within the tube 120, a core element 122 positioned within the lumen 128 of the hollow tube 120, and four light emitting diode ("LED") strips 124 positioned within the lumen 128 of the hollow tube 120 and coupled to the core element 122. The hollow tube 120 may be constructed of silicone, for example. However, other materials may be used without limitation. In certain instances, the diameter of the tube may be between about 1.5 inches to 2 inches. In certain instances, the diameter of the hollow tube 120 may be larger than 2 inches or smaller than 1.5 inches. The hollow tube 120 may include holes 126 through the tubular wall of the hollow tube 120. The holes 126 may be distributed evenly along the length of the tube 120. For example, the holes may be spaced-apart about 2 inches. The hole spacing may, however, be modified without limitation.

Additionally or alternatively, the holes 126 may be distributed circumferentially on the tube 120. As seen in FIG. 2, there are four holes 126 around the perimeter of the tube 120. The holes 126 provide an outlet for the gas that is dispensed into the tube 120. The gas provides many functions including cooling the LED light strips 124, providing nutrients to the plants, and killing unwanted pests on the plants.

The LED strips 124 is a flexible circuit board including a series of surface mounted LEDs 130 and resistors mounted to a printed circuit board (e.g., a positive copper pathway and a negative copper pathway running the length of the strip). The LEDs 130, resistors and printed circuit board may be mounted to a flexible backing material 132, which may include an adhesive backing. When connected to the power supply 106, the copper strips act as conductors allowing electrons to flow from one end of the strip to the other. LED strips 104 are conventionally housed on spools and can be cut to length at defined points along the length. The cut-points can serve as connection points for the end connectors or connection to a junction box, or the power supply 106.

The LED strips 124 may be manufactured with a custom spectrum for the LEDs 130 that are specific to the lighting requirements of the intra-canopy of a particular plant. For instance, the LEDs 130 may emit UV-A light, UV-B light, or both UV-A light and UV-B light. UV-A and UV-B have different wavelengths, both being in a range to facilitate plant growth. Additionally or alternatively, far red and infrared spectrum LEDs 130 may be utilized to facilitate plant growth.

As seen in FIG. 2, there are four LED strips 124 coupled to the core element 122. The four LED strips 124 are oriented with two pairs oriented in opposite directions, and the pairs are oriented perpendicular to each other. Stated differently, each of the four LED strips 104 are oriented ninety degrees from the adjacent strip 124. While the present disclosure describes and depicts four LED strips 124, it is understood that more or fewer LED strips 124 may be utilized in the system 100. One advantage to using multiple LED strips 124 is that a more fully circumferential field can be lit.

The core element 122 may include a series of spacers or washers 134 and a series of core bodies 136 positioned within the lumen 128 of the hollow tube 120 and extending the length. In certain instances, as seen in FIG. 3, the spacers 134 and core bodies 136 are arranged in an alternating arrangement. The core bodies 136 may be a heat sink for the LED strips 124. To facilitate the dispersion of heat from the LED strips 124, the core bodies 136 may be constructed of a metal, such as an aluminum alloy, or silicone, among other suitable materials. The spacer 134 may be manufactured from a flexible material such as silicone, plastics, or rubbers, or other suitable material. With an alternating arrangement of spacers 134 and core bodies 136, the collective core element 122 may be flexible so as to accommodate flexing of the hollow tube 120. The spacers 134 and core bodies 136 may be coupled together or may be free within the hollow tube 120 and held in place by the LED strips 124 coupling to the core element 122.

As seen in FIGS. 2 and 3, the spacer 134 may be a circular ring or disk. The spacer 134 may, however, be other shapes without limitation. The core body 136 may be star-shaped and include projections or triangular segments 138 extending outward from planar segments 140. The planar segments 140 may be sized to fit the widths of the LED strips 124. The diameter of the star-shaped core body 136 may be sized to about or slightly shorter than the inner diameter of the hollow tube 120. In this way, the LED strips 124 are maintained centrally within the lumen 128 of the tube 120 by the projections 138 contacting the inner wall of the hollow tube 120. This provides consistent lighting circumferentially and avoids "hot spots" where the LED strips 124 are too close to the inner wall of the tube 120, which could cause burning of the plants. As seen in FIG. 3, the spacer 134 has a through-hole, but the core body 136 does not. The spacer 134 and core body 136 may be alternatively constructed, such as both including through-holes, neither including through-holes, or one including a through-hole. The core body 136 may be constructed of different shapes without limitation. For example, the core body 136 may be a square-body with pins projecting outward to contact the inner wall of the tube 120.

As can be understood by FIGS. 2 and 3, when gas is dispensed within the lumen 128 of the hollow tube 120, the gas fills and disperses within four areas formed by the space between the projections 138 of the core bodies 136. As the gas travels through the tubular body 120, the gas exits through the holes 126 in the tubular wall of the tube 120. The gas functions to cool the LED strips 124 and the core element 122 acting as a heat sink for the LED strips 124. In certain instances, the gas delivery system 110 may be used to heat the plants surrounding the lighting strands 104. For example, when air temperature is lower than optimal for a plant 102 (e.g., early season, outdoor grape production), the gas from the tank 112 may be heated via a gas heater and dispensed into the lighting strands 104 to warm the plants. Additionally or alternatively, the rate of delivery of the gas may be reduced in order to allow the heat from the LED strips 124 to be transferred from the lighting strands 104 to the plants 102.

The following is a description of an exemplary use of the system 100. A user may operate the computer system 109, in communication with the controller 108, and sets a schedule for the lighting of the plants 102, and for the delivery of gas through the system 100. The user may additionally set a watering schedule, among other schedules. The user may set the parameters of the various schedules with a user interface on the computer 109. When a particular schedule begins, power may be supplied to the one or more lighting strands 104 positioned through the intra-canopy of the plants 102, as seen in FIG. 1. The controller 108 may signal the valve 114 connected to the gas tank 112 to open and dispense gas (e.g., $CO_2$) into the light strands 104. The plants 102 in the facility are supported by the trellis lighting system 100, provided with intra-canopy light by the lighting strands 104, and dispensed with $CO_2$ gas. The dispensing of low temperature $CO_2$ within the lighting strands 104 ensures the plants are unharmed by the heat generate from the LED strips 124.

FIGS. 4-9 depict a lighting strand 104, in another instance, which may be used as part of the lighting system 100. And it is noted that features from the previous lighting strand 104, depicted in FIGS. 2-3, may be combined with features from the lighting strand of FIGS. 4-9 to form additional or alternative lighting strands 104 without limitation. The illustrated embodiments are not intended to be limiting. Instead, the embodiments are merely illustrative of the possible components and uses of the lighting strands 104 within the system 100.

Figure 6:
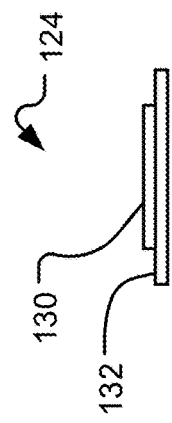
FIG. 6 is a transverse view of an LED strip for use with the LED strip clip of FIG. 5.
Figure 5:
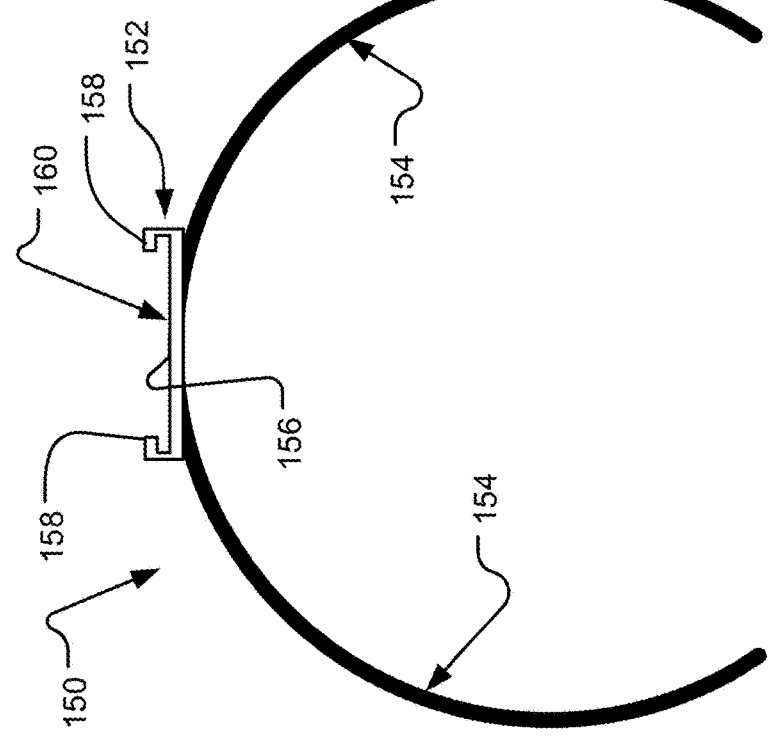
FIG. 5 is a transverse view of an LED strip clip for use with the tube of FIG. 4.
Figure 4:
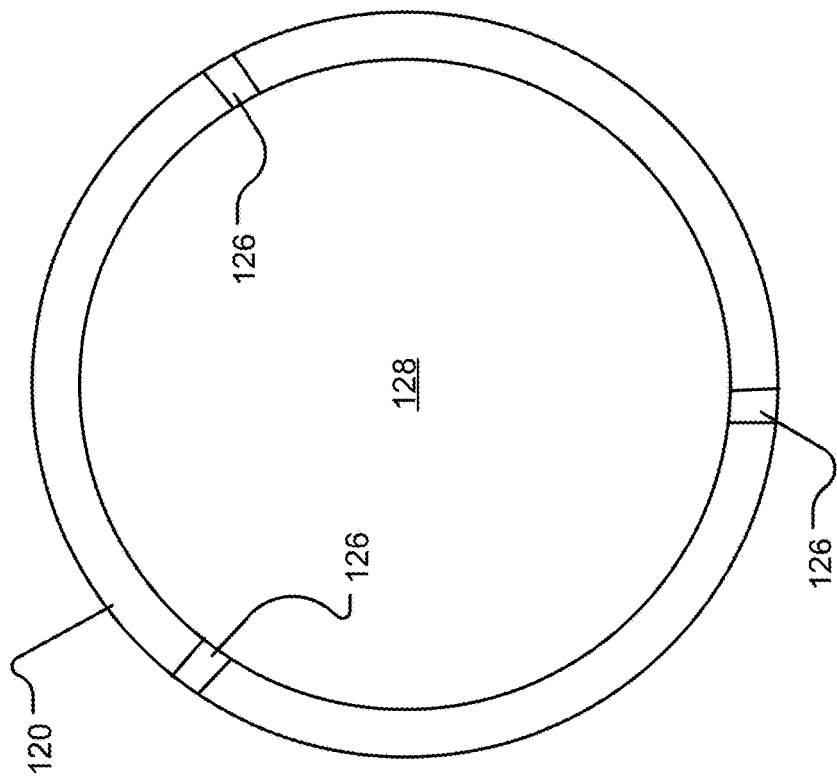
FIG. 4 is a transverse cross-section of a tube of a lighting strand of another embodiment.

To begin, reference is made to FIGS. 4-6. FIG. 4 depicts a transverse cross-section of a tube 120 of the lighting strand 104. FIG. 5 depicts a transverse view of an LED strip clip 150 for use with the tube 120 of FIG. 4. And FIG. 6 depicts a transverse view of an LED strip 124 for use with the LED strip clip 150 of FIG. 5. Referring to FIG. 4, the tube 120 may be constructed of silicone, however, other materials may be used without limitation. In certain instances, the diameter of the tube 120 may be between about 1.5 inches to 2 inches. In certain instances, the diameter of the hollow tube 120 may be larger than 2 inches or smaller than 1.5 inches. The hollow tube 120 may include holes 126 through the tubular wall of the hollow tube 120. The holes 126 may be distributed evenly along the length of the tube 120. For example, the holes may be spaced-apart about 2 inches. The hole spacing may, however, be modified without limitation.

Additionally or alternatively, the holes 126 may be distributed circumferentially on the tube 120. As seen in FIG. 4, there are three holes 126 around the perimeter of the tube 120. The holes 126 provide an outlet for the gas that is dispensed through the lumen 128 of the tube 120. The gas provides many functions including cooling the LED light strips 124, providing nutrients to the plants, and killing unwanted pests on the plants. The tube 120 may provide structure to the entire light strand 104. In certain instances, a supporting wire may be positioned through the lumen 128 of the tube to provide structural support to the lighting strand 104 (i.e., so the tube 120 does not sag by its own weight). In certain instances, no wire is needed; the tube may provide sufficient structural rigidity to resist sag.

The tube 120 of FIG. 4 works in conjunction with the LED strip clip 150 of FIG. 5 (also called a spring clip) to secure the LED strip 124 of FIG. 6 to the tube 120. As seen in FIG. 5, the LED strip clip 150 includes a base 152 and a pair of arms 154 extending from the base 152 to form a C-shape. The arms 154 are flexible or spring-like and capable of springing outward in order to fit around the tube 120. Once the arms 154 are positioned around the tube 120 the arms 154 will exert an inward force on the tube 120 and be held in place by the force on the tube 120. The arms 154 may be made of a metal or plastic material without limitation with sufficient flexibility to fit around the tube 120 and exert sufficient pressure on the tube 120 so that the spring clip 150 generally stays in place. The pair of arms 154 may be two separate arms that are coupled to the base 152, a single arm that is coupled to the base, or the base 152 may be integrally formed with the arms 154.

The base 152 includes base plate 156, and a pair of flanges 158 extending up from ends of the base plate 156. The flanges 158 form a channel 160 for the LED strip 124 to fit therein. As seen in FIG. 6, the LED strip 124 is a flexible circuit board including a series of surface mounted LEDs 130 and resistors mounted to a printed circuit board (e.g., a positive copper pathway and a negative copper pathway running the length of the strip). The LEDs 130, resistors and printed circuit board may be mounted to a flexible backing material 132, which may include an adhesive backing. When connected to the power supply (not shown in FIG. 6), the copper strips act as conductors allowing electrons to flow from one end of the strip to the other. LED strips 104 are conventionally housed on spools and can be cut to length at defined points along the length. The cut-points can serve as connection points for the end connectors or connection to a junction box, or the power supply.

The backing material 132 fits within the pair of flanges 158 of the base 152 with the bottom of the backing material 132 facing the base plate 156. The LED strip 124 may be slid within the pair of flanges 158 of the base 152 or bent slightly so the material 132 fits within the channel 160. As an alternative to using a base 152 with a pair of flanges 158, the base 152 may be a bar (e.g., rectangular bar) without flanges that the backing material 132 is adhered to via an adhesive, fastener, or the like. In any of the embodiments, the base 152 may act as a heat sink for the LEDs 130.

Reference is made to FIG. 7, which depicts a transverse cross-section of the assembled lighting strand 104. As seen in the figure, there are LED strip clips 150 releasably coupled or secured to the tube 120. The LED strip clips 150 are arranged about one hundred twenty degrees away from each other on the perimeter of the tube 120. This results in the LED strips 124 also being arranged about one hundred twenty degrees away from each other on the perimeter of the tube 120. There is a hole or gas port 126 positioned between each of the LED strips 124. In this way, as a gas (e.g., air, carbon dioxide) is forced through the lumen 128 of the tube 120, the gas exits the gas ports 126 that are positioned longitudinally along the tube 120. The gas leaving the gas ports 126 (as indicated by the three broken line arrows in FIG. 7) cools the LEDs 130 on the LED strips 124 and the electrical components on the backing strip 132. In this way, lighting and gas cooling of the lighting is provided in three hundred sixty degrees to the intra-canopy of plants.

Figure 8:
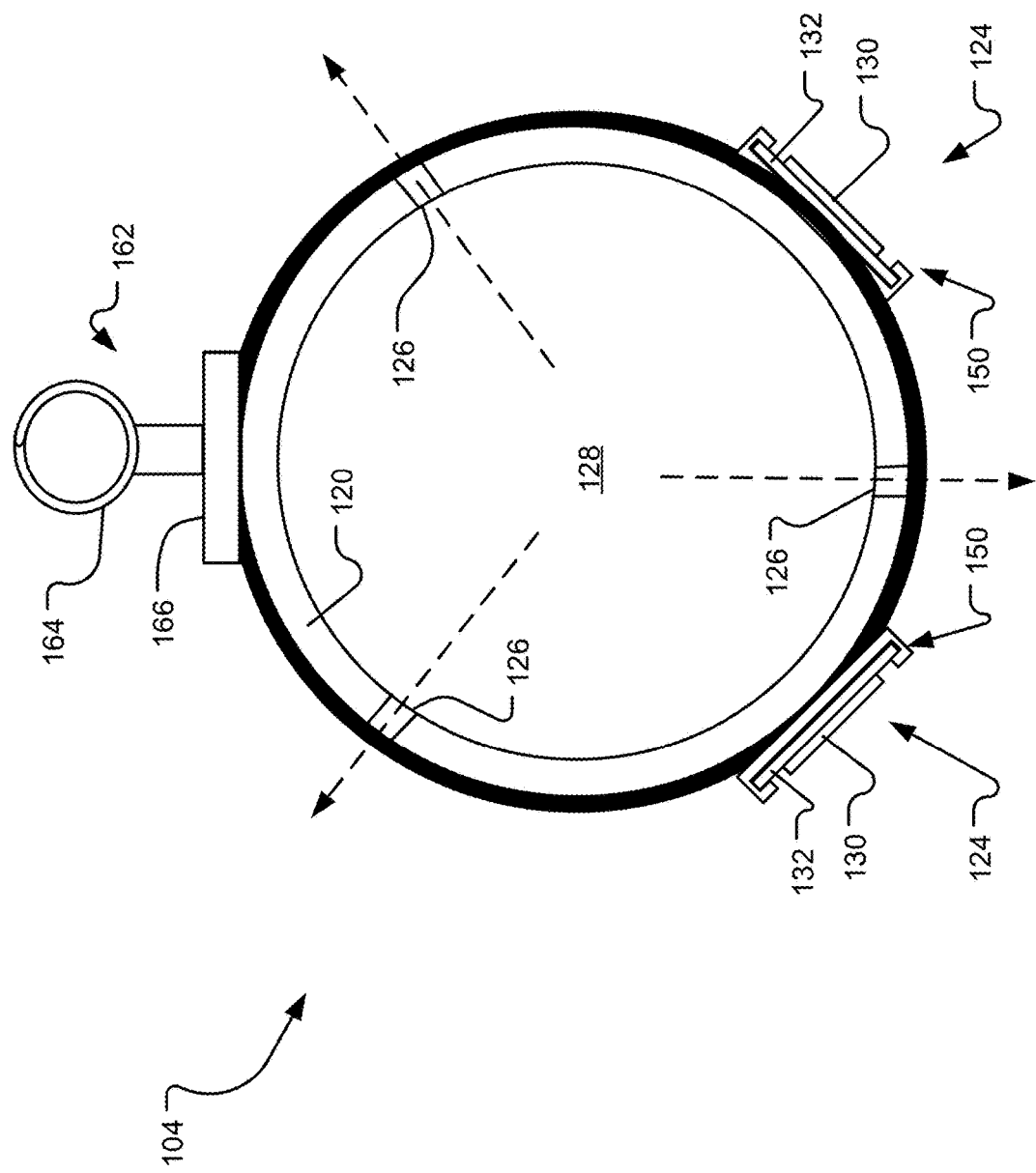
FIG. 8 is a transverse cross-section of a lighting strand of the trellis lighting system utilizing a wire loop to support the lighting strand.

FIG. 8 depicts an alternative arrangement of the lighting strand 104 of FIG. 8. More particularly, the lighting strand 104 includes two LED strips 124 coupled respectively to two LED strip clips 150. In place of the third LED strip is a wire clip 162. The wire clip 162 includes a pair of arms 154 similar to the arms of the LED strip clips 150, a base 166 coupled to the arms 154, and a wire loop 164 coupled to the base 166. The wire loop 166 may be a ring, hook, or corkscrew, among other designs. The wire loop 166 is designed to be supported by a wire such that, when the wire clip 162 is coupled to the tube 120, a wire may be positioned through one or a plurality of wire loops 166 of the wire clips 162 positioned along a length of the tubing 120. In this way, the weight of the lighting strand 104 is transferred to the wire, which can be tensioned without damaging the components of the lighting strand 104. Such tensioning decreases sag of the lighting strand 104 as it is suspended between opposing supports in a growing facility.

While the wire clip 162 is shown in place of an LED strip clip 150, it is foreseen that the wire clip 162 may be positioned elsewhere along the perimeter of tube 120 such that the lighting strand 104 may still utilize three LED strip clips 150 and three LED strips 124, such as shown in FIG. 7. In such an instance, there would be four rows of clips: three rows of LED strip clips 150 and one row of wire clips 162.

Figure 9:
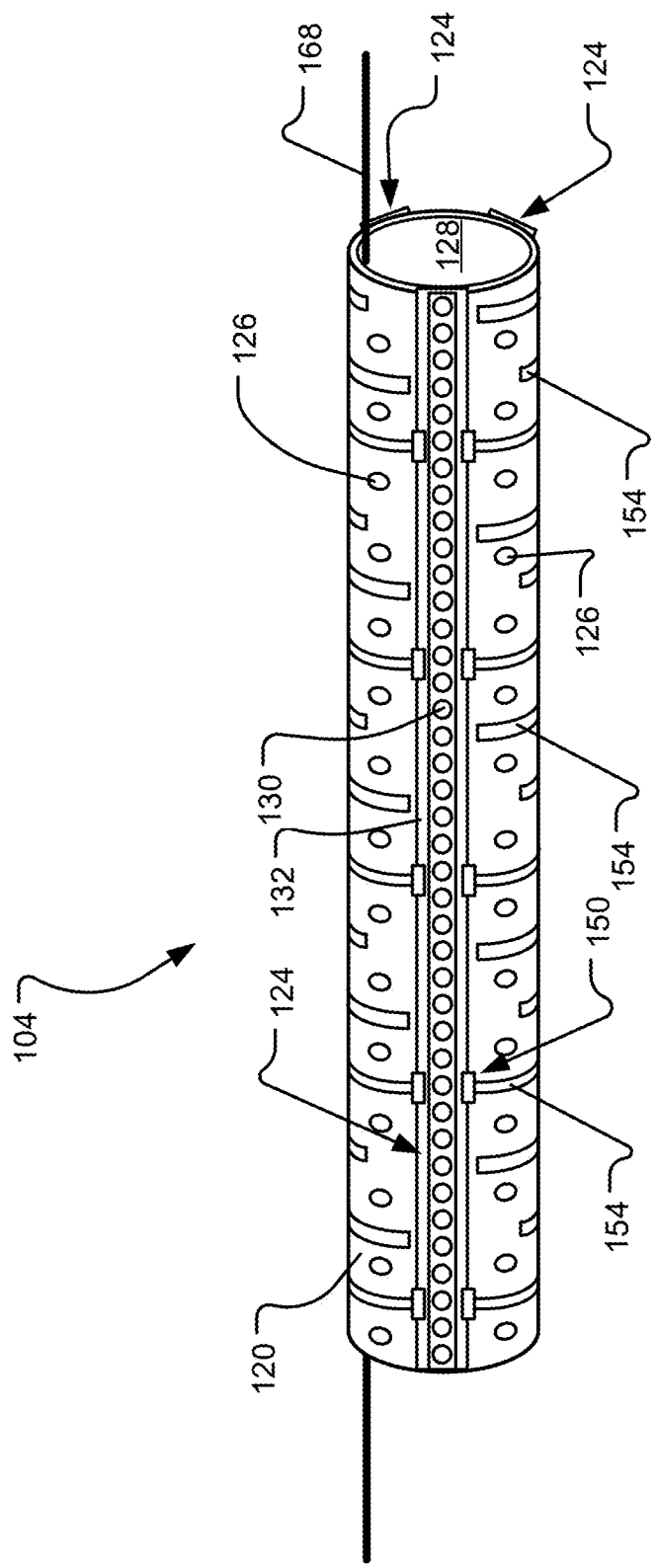
FIG. 9 is a side view of the lighting strand of the trellis lighting system.

Now referring to FIG. 9, which is a side view of the light strand 104 of FIG. 7, the light strand 104 is suspended by a wire 168 extending through the lumen 128 of the tube 120. As seen in the figure, the tube 120 is perforated via the holes 126 extending through the tube 120 allowing gas to flow from the lumen 128 of the tube to the outer portion of the tube 120 in order to cool the LED strips 124. There are three LED strips 124 on the lighting strand 104, positioned generally equidistant around the perimeter of the tube 120. Each of the LED strips 124 is secured to the tube 120 via a plurality of LED strip clips 150. The LED strips 124 are removably secured to the clips 150 for replacement of the strips 124. FIG. 9 depicts merely a section of the lighting strand 104, but it is understood that the lighting strand 104 may be coupled with additional strands 104 to form a trellis, lattice, or net, as depicted in FIG. 1. And while the electrical and gas components of the system 100 are not shown it FIG. 9, it is understood that such components are used with the lighting strand 104 in FIG. 9.

FIGS. 10-22 depict another embodiment of a lighting and support assembly 1000 of a trellis lighting system 100 and its components in accordance with aspects of the disclosure. Any of the components previously described may be added or substituted with components of the trellis lighting system 1000 described in reference to FIGS. 10-22, and vice versa. It is understood that the lighting and support assembly 1000 described in reference to FIGS. 10-22 may be utilized with the overall trellis lighting system 100 as shown in FIG. 1 without limitation.

Figure 10:
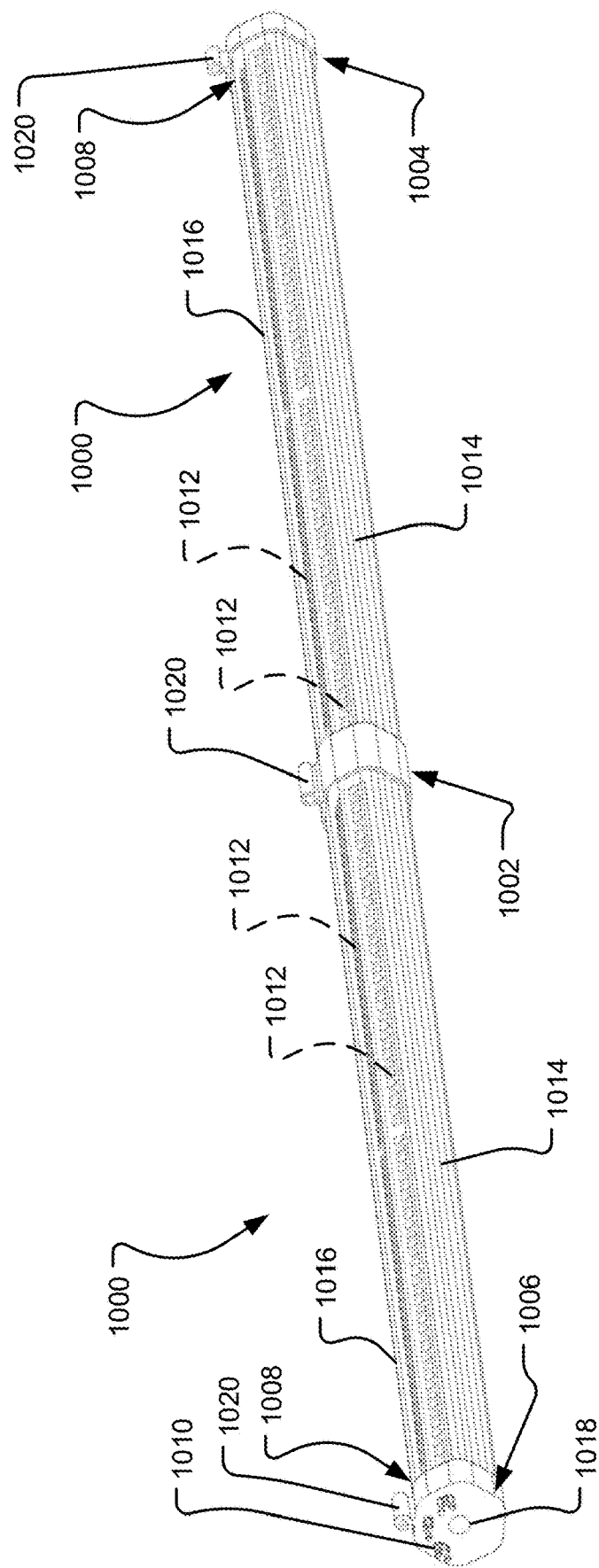
FIG. 10 is an isometric view of two lighting and support assemblies coupled together via a connector with an end plug and end cap coupled to the ends of the assemblies.

To begin the discussion of the lighting and support assembly 1000, reference is made to FIG. 10, which is an isometric view of two lighting and support assemblies 1000 coupled together via a connector 1002 with an end plug 1004 and end cap 1006 coupled to the ends 1008 of the assemblies 1000. The connector 1002, end cap 1006, and end plug 1004 secure the individual lighting and support assemblies 1000. Additionally, the connector 1002 links multiple lighting and support assemblies 1000 together to create a modular assembly that can be scaled to the size of a particular growing operation. The end cap 1006 includes openings 1010 that function as a passageway for the electrical conductors (e.g., wires) of the LED strips 1012 that are coupled to a heat sink 1014, and covered by a cover, cap, or shield 1016 that permits light to pass through. The end caps 1006 also include an opening 1018 that is centralized for the passage of fluid (e.g., gas) into the lighting and support assemblies 1000, in particular a central cavity of the heat sinks 1014 for cooling the LED strips 1012.

The connector 1002, in addition to coupling a pair of opposed lighting and support assemblies 1000, includes a centralized opening (not visible in FIG. 10) for fluid passage to cool the LED strips 1012 of multiple lighting and support assemblies 1000. The end plug 1004, unlike the end cap 1006, does not include openings for the passage of wires and gas. The end plug 1004 holds the components of the lighting and support assembly 1000 together, but the end plug 1004 does not include a central opening so that the flow of gas within the collection of lighting and support assemblies 1000 is blocked. The end plug 1004 may include openings for the passage of or access to the wires. As seen in FIG. 10, each of the connector 1002, end plug 1004, and end cap 1006 include a hook 1020 for attach to a wire or support system such as the suspension structure 116 shown in FIG. 1.

Figure 11:
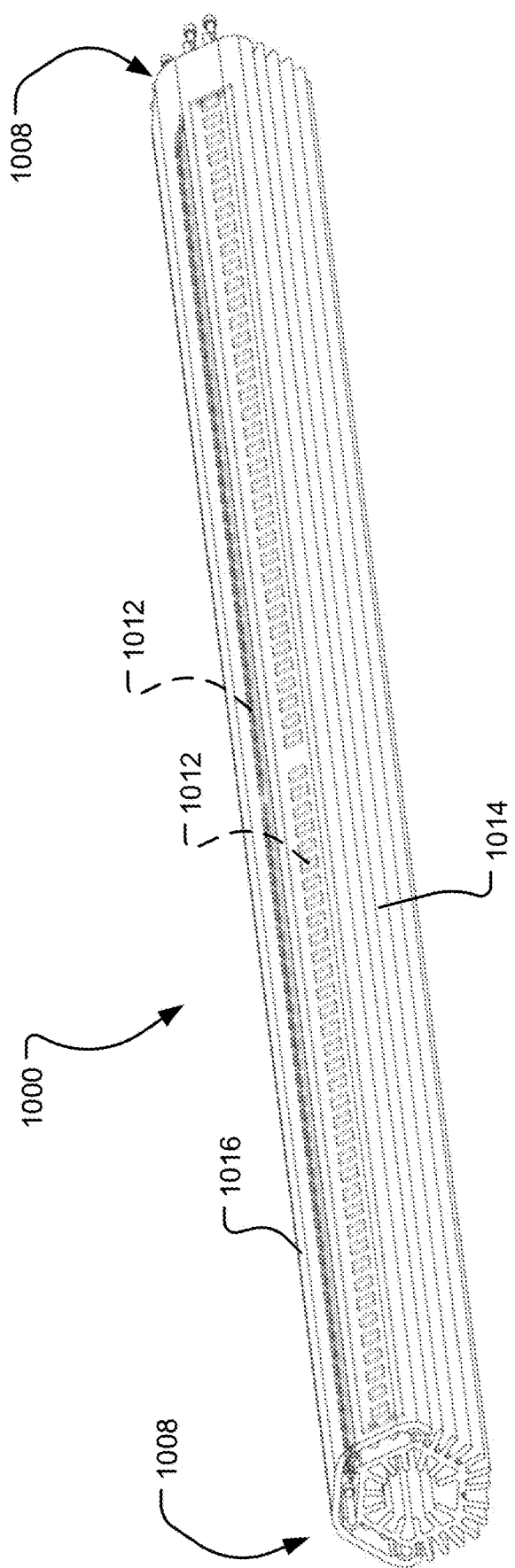
FIG. 11 is an isometric view of a lighting and support assembly.
Figure 12:
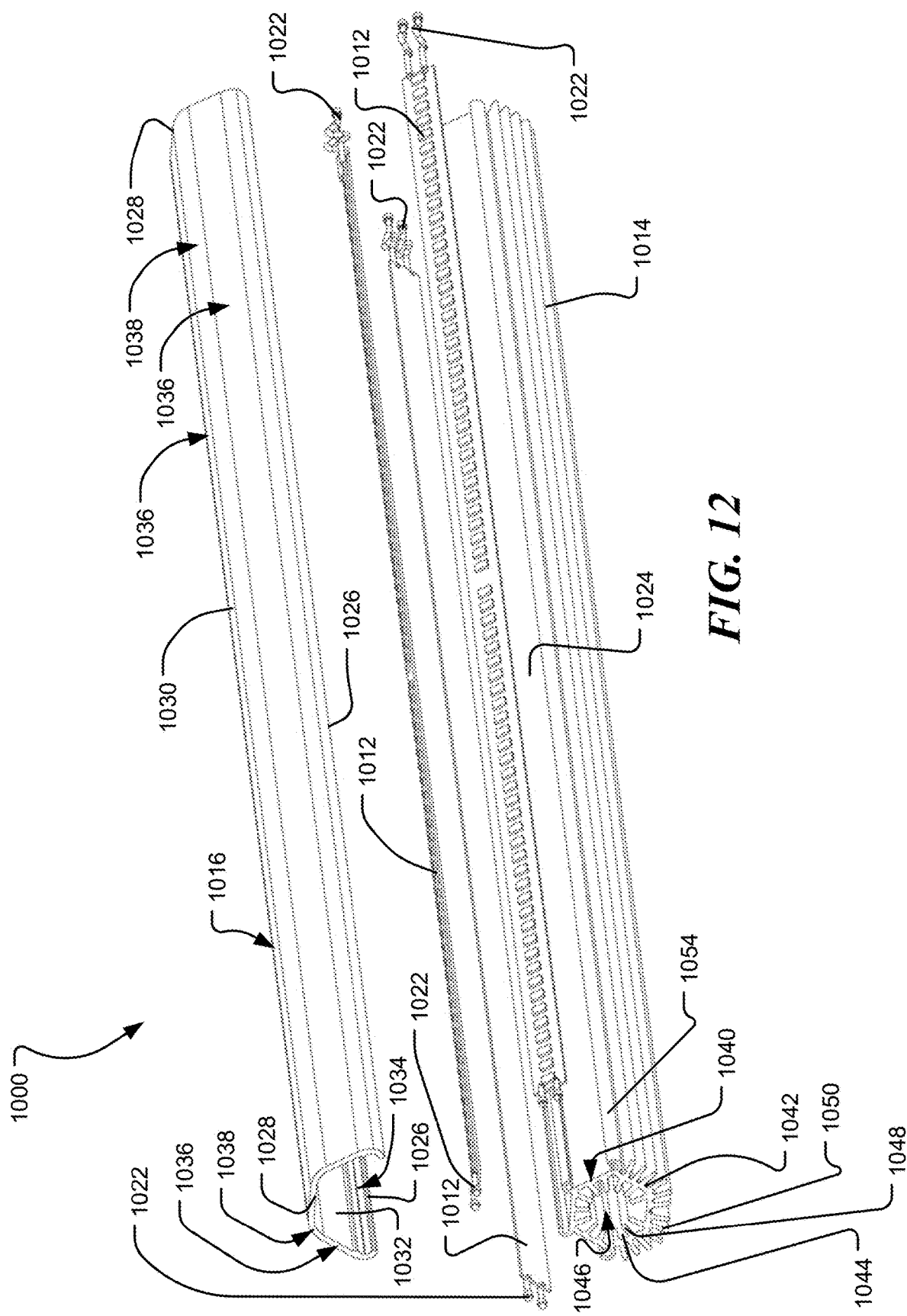
FIG. 12 is an exploded isometric view of the lighting and support assembly of FIG. 11.

FIGS. 11 and 12 show the lighting and support assembly 1000 without connection to the connector 1002, end plug 1004, and end cap 1006. FIG. 11 is an isometric view of the lighting and support assembly 1000, and FIG. 12 is an exploded isometric view of the lighting and support assembly of FIG. 11. As seen in the figures, the assembly 1000 includes three LED strips 1012 which are the same as the LED strips 124 described previously in this disclosure. The LED strips 1012 extend the length of the heat sink 1014 and include electrical connectors 1022 at the ends for coupling to additional LED strips 1012, as well as a power supply (not shown in FIGS. 11 and 12). The LED strips 1012 are coupled to planar surfaces 1024 on the heat sink 1014 by, for example, an adhesive (e.g., thermal adhesive).

Figure 13:
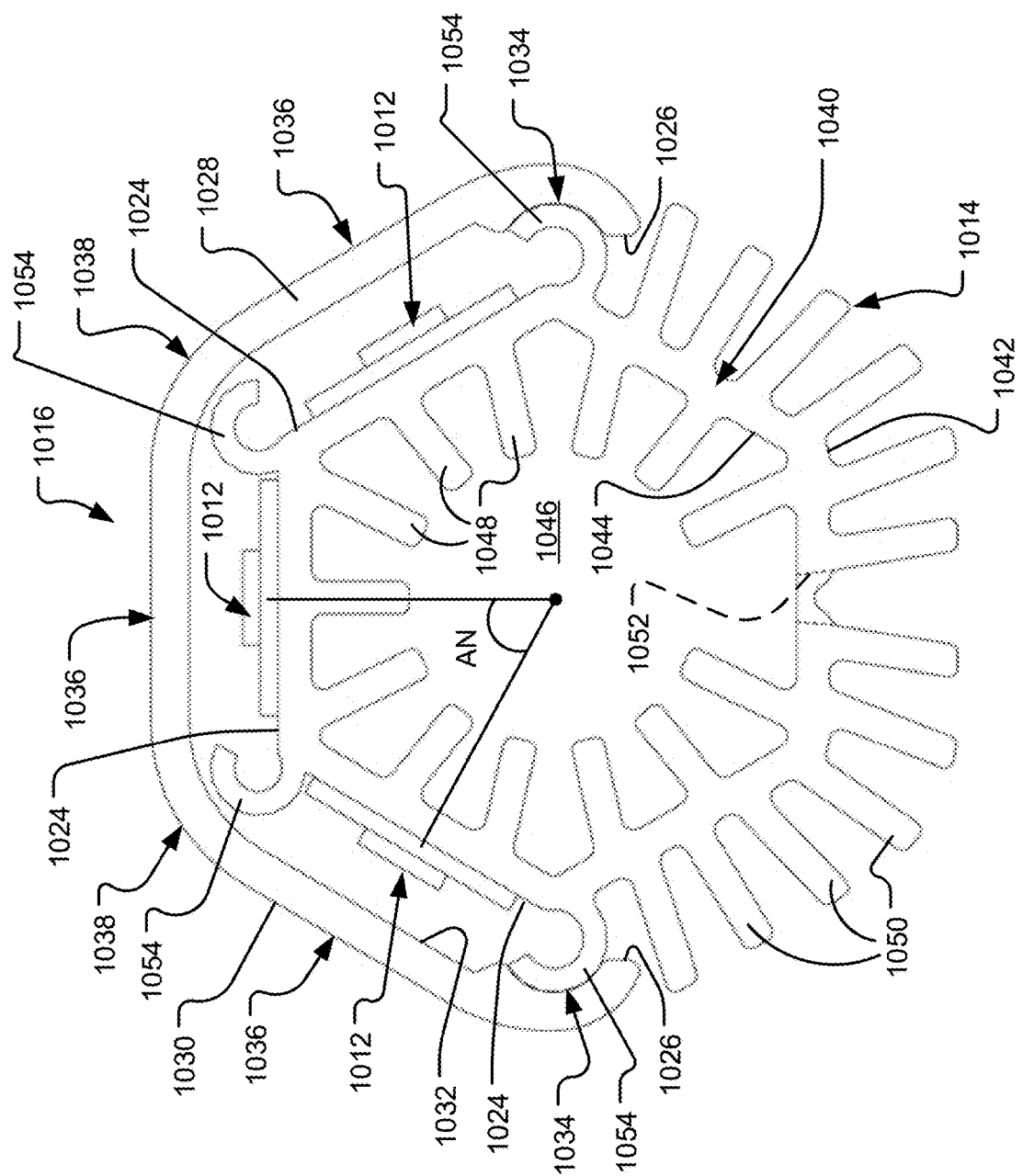
FIG. 13 is an end view of the heat sink of the lighting and support assembly.

Referring to FIGS. 12 and 13, FIG. 13 being an end view of the heat sink 1014 and cover 1016 of the lighting and support assembly 1000 (the electrical connectors 1022 not shown in FIG. 13 so as to not obscure the other components), the cover 1016 is a curved structure made of a translucent material that permits light to pass through. The cover 1016 may, for example, be constructed of polycarbonate or other material permitting light to pass through. The cover 1016 includes a pair of longitudinal edges 1026 that extend a length of the cover 1016. The longitudinal edges 1026 are linear and are bounded on opposite sides by side edges 1028 that are curved. The cover 1016 also includes an outer surface 1030, and an inner surface 1032 opposite the outer surface 1030. The cover 1016 includes a pair of cylindrical surfaces 1034 extending the length of the cover and formed on the inner surface 1032. There is one cylindrical surface 1034 near each of the longitudinal edges 1026, as seen in FIG. 13. As seen in FIG. 13, the cover 1016 includes three planar sections 1036 separated by two curved sections 1038. In this way, the planar sections 1036 of the cover 1016 are generally parallel with the planar surfaces 1024 of the heat sink 1014. And as seen in FIG. 13, the LED strips 1012 are positioned between the cover 1016 and the heat sink 1014.

Referring to the heat sink 1014 as shown in FIGS. 12-13, the heat sink 1014 includes a hexagonal body 1040 defined by six generally planar sections. The hexagonal body 1040 includes an outer surface 1042, an inner surface 1044 opposite the outer surface 1042, and a lumen or passageway 1046 extending longitudinally through the inner surface 1044 between opposite ends. The body 1040 includes a series or plurality of fins 1048 extending inward from the inner surface 1044, and a series or plurality of fins 1050 extending outward from the outer surface 1042 on a lower half of the body 1040. That is, the entire inner surface 1044 may be defined by inward facing fins 1048, and a portion of the outer surface 1042 that is not covered by the cover 1016 includes outward facing fins 1050. As seen in FIG. 13, the fins 1050 on the outer surface 1042 are included on three of the planar sections of the hexagonal body 1040.

The heat sink 1014 includes a transverse opening 1052, shown in broken line in FIG. 13, which extends from the outer surface 1042 to the inner surface 1044. There may be one or more transverse openings 1052 extending through the heat sink 1014. The transverse openings 1052 permit gas that is delivered into the lumen 1046, in order to cool the heat sink 1014 and ultimately dissipate heat from the LED strips 1012 attached to the heat sink 1014, to escape out of the heat sink 1014 such that additional cooling gas can flow through the heat sink 1014. Without a passageway for the cooling gas to escape the heat sink 1014, additional cooling gas could not be delivered into the heat sink 1014. Thus, the transverse openings 1052 provide a release for the gas so gas can continue to flow through the heat sink 1014. The size and number of the transverse openings 1052 may vary depending on the cooling needs of the system. In certain instances, there may be many openings 1052 in each section of the heat sink 1014 and a user may plug some of the openings as needed to restrict the fluid flow.

The heat sink 1014 further includes four curved or cylindrical fins, otherwise known as protrusions, 1054 extending from the outer surface 1042. The curved fins 1054 include a cylindrical surface that generally matches the shape and size of the cylindrical surfaces 1034 of the cover 1016. In this way, the cover 1016 can couple to the heat sink 1014 via snapping or engaging the cylindrical fins 1054 of the heat sink 104 with the corresponding cylindrical surfaces 1034 of the cover 1016. The cover 1016 may flex in order to permit the cover 1016 to snap into engagement with the heat sink. As seen in FIG. 13, two of the cylindrical fins 1054 do not snap into engagement with the cover 1016; instead, the two cylindrical fins 1054 separate the LED strips 1022 and provide a barrier from the cover being pressed too close to the LED strips 1022, a situation that may damage the LED strips 1022. Additionally, the two cylindrical fins 1054 positioned inward of the curved sections 1038 of the cover 1016 prevent the cover from moving inward, which insures that the cover remains a constant distance from the LED strips 1012. This may be important for plants that are close to or in direct contact with the cover 1016 because a cover 1016 that is too close to the LED strips 1012 could create a "hot spot" that could burn the plants. As seen in FIG. 13, the cover 1016 maintains a constant distance from the LED strips 1012 leading to uniform and predictable temperature distribution outside the cover 1016.

As seen in FIG. 13, a pair of adjacent LED strips 1012 point an angle AN of sixty degrees away from each other. Thus, the three LED strips 1012 span one hundred twenty degrees. The LED strips 1012 direct light generally outward from the LED strips 1012, not in a single direction. Thus, the three LED strips 1012 generally direct light in greater than one hundred eighty degrees.

In operation, the LED strips 1012 generate heat, and the heat is dissipated through the planar surfaces 1024 of the heat sink 1014 to the other portions of the heat sink 1014. The heat dissipates via conduction to the inner and outer fins 1048, 1050. The ambient air cools the outer fins 1050 via conduction, and the fluid within the lumen 1046 cools the inner fins 1048 via conduction as well. In certain instances, there may not be a need to deliver cooling gas within the lumen 1046 in order to cool the heat sink 1014. In certain instances, there will be a need to deliver cooling gas within the lumen 1046 in order to cool the heat sink 1014.

Reference is made to FIGS. 14 and 15, which are, respectively, outer and inner isometric views of an end cap 1006 for coupling to an intake end of the lighting and support assembly 1000 (not shown in FIGS. 14 and 15). As seen in the figures, the end cap 1006 includes a hexagonal body 1056 defined by six generally planar sections, an end wall 1058 including three openings 1010 for accommodating the passage of the wires associated with the LED strips. The end cap 1006 also includes a central opening 1018 for coupling with a nozzle of a hose of a gas delivery system. The end cap 1006 also include a hook 1020 at a top of the end cap 1006 for coupling with a wire or suspension system. As seen in FIG. 15, the end cap 1006 includes a central structure 1060 that is coupled to and extends from the end wall 1058. The central structure 1060 includes a plurality of fingers 1062 that are a negative shape of the fins 1048 projecting from the inner surface 1044 of the heat sink 1014. In this way, the plurality of fingers interdigitate with the fins 1048 projecting from the inner surface 1044 of the heat sink 1014. As seen in FIG. 15, an outer surface of the structure 1060 is hexagonal shaped in order to match the inner shape of the inner surface 1044 of the heat sink 1014.

Figure 16:
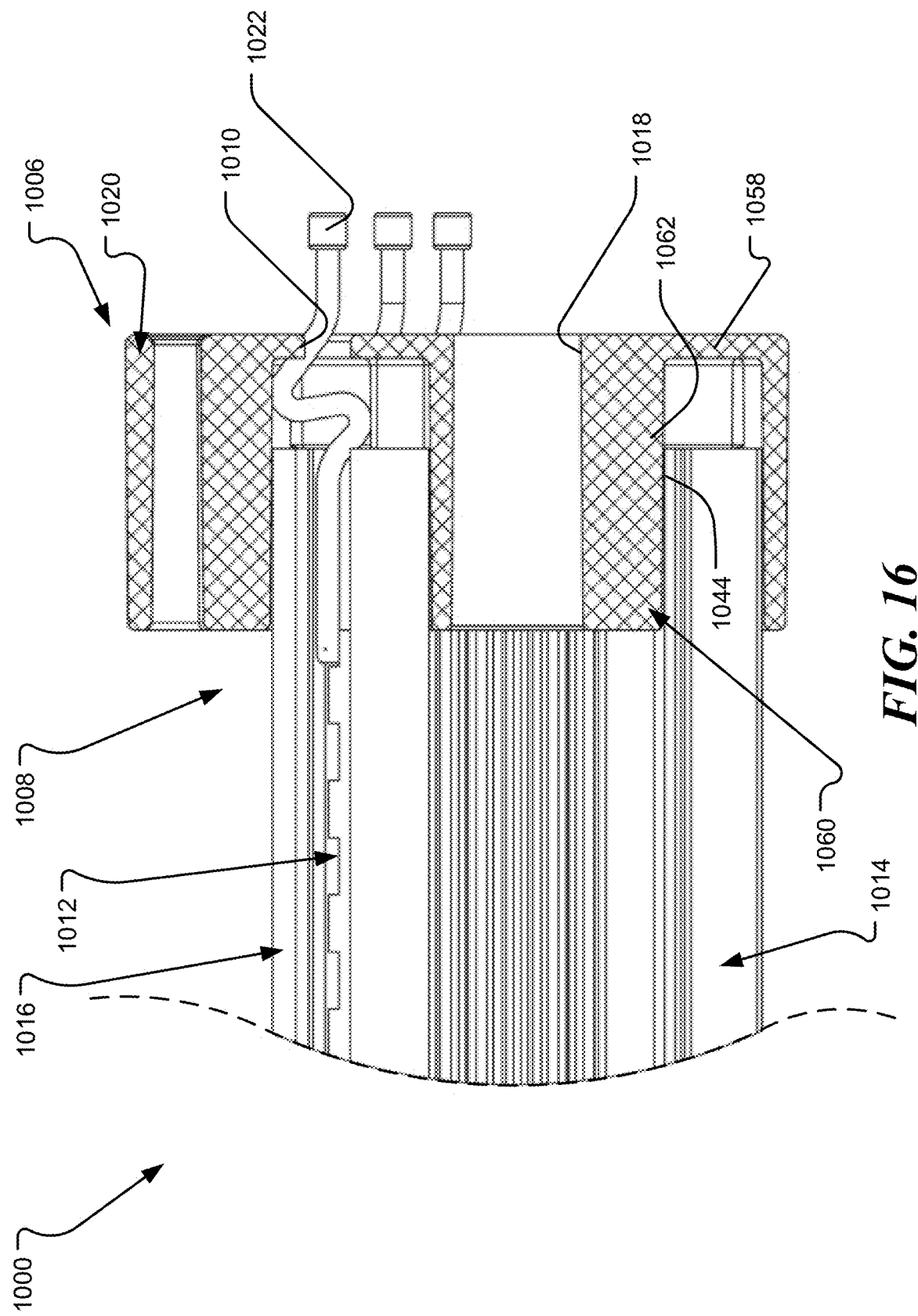
FIG. 16 is a cross-sectional side view of the end cap coupled to an intake end of the lighting and support assembly.

In this way, as seen in FIG. 16, which is a longitudinal cross-sectional side view of the end cap 1006 coupled to an intake end 1008 of the lighting and support assembly 1000, the end cap 1006 secures the cover 1016 and the heat sink 1014 together at the intake end 1008 of the assembly 1000. The central opening 1018 provides a passageway for gas to be delivered within the lumen of the heat sink 1014, and the wire openings 1010 provide a passageway for the wires 1022 of the LED strips 1012. And as seen in FIG. 16, the inner surface 1044 of the heat sink 1014 abuts the central structure 1060 so as to seal the end 1008 of the lighting and support assembly 1000.

Figure 18:
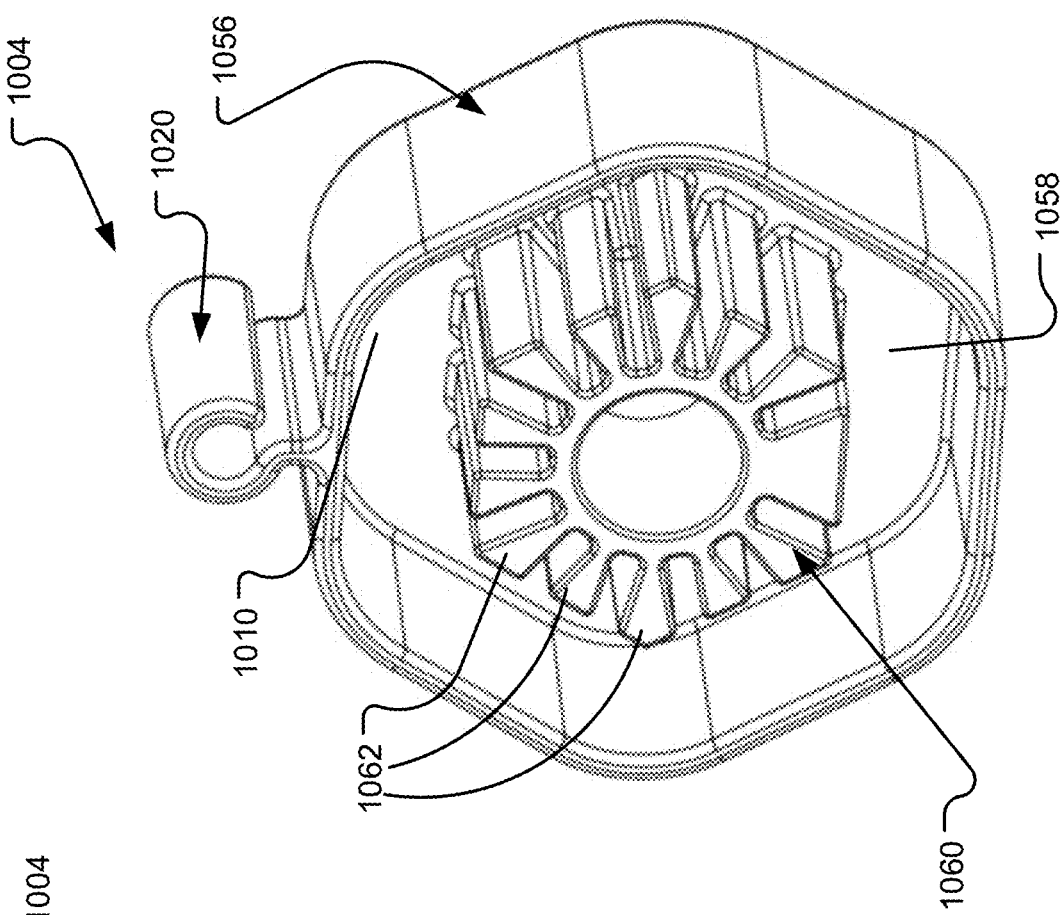
FIGS. 17 and 18 are, respectively, outer and inner isometric views of an end plug for coupling to a terminal end of the lighting and support assembly.
Figure 17:
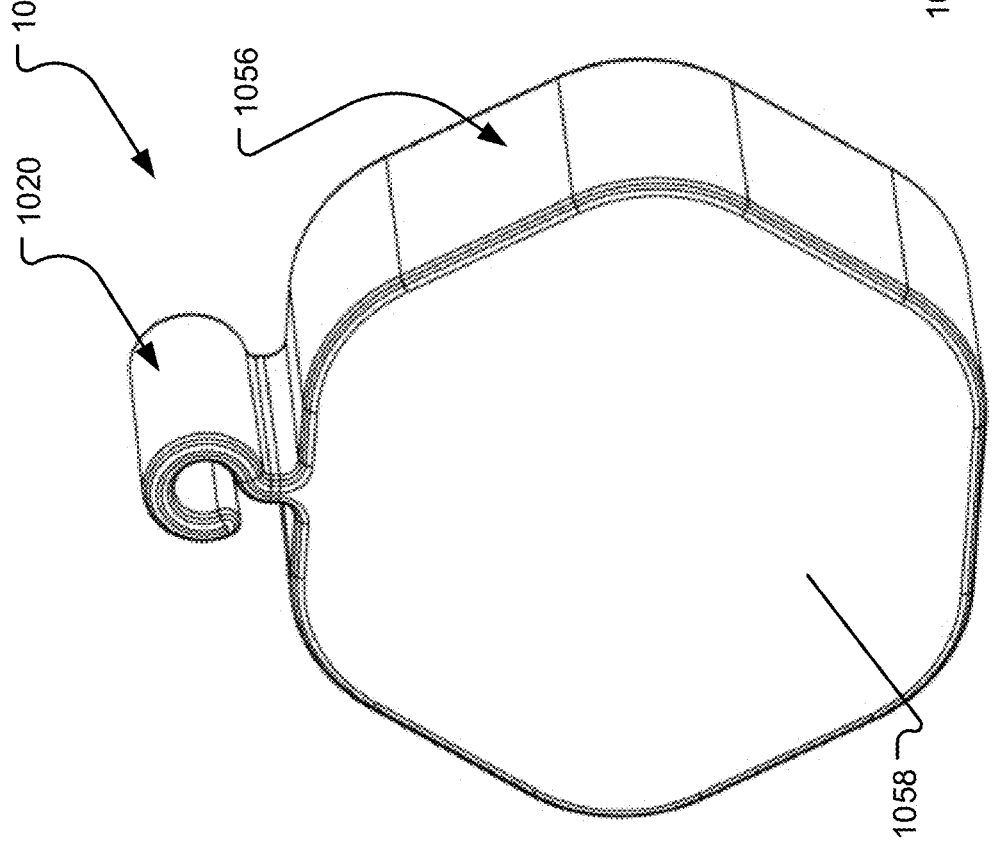

Reference is made to FIGS. 17 and 18, which are, respectively, outer and inner isometric views of an end plug 1004 for coupling to a terminal end of the lighting and support assembly 1000 (not shown in FIGS. 17 and 18). As seen in the figures, the end plug 1004 includes a hexagonal body 1056 defined by six generally planar sections, and a blank end wall 1058. The end plug 1004 also include a hook 1020 at a top for coupling with a wire or suspension system. As seen in FIG. 18, the end plug 1004 includes a central structure 1060 that is coupled to and extends from the end wall 1058. The central structure 1060 includes a plurality of fingers 1062 that are a negative shape of the fins 1048 projecting from the inner surface 1044 of the heat sink 1014. In this way, the plurality of fingers interdigitate with the fins 1048 projecting from the inner surface 1044 of the heat sink 1014. As seen in FIG. 18, an outer surface of the structure 1060 is hexagonal shaped in order to match the inner shape of the inner surface 1044 of the heat sink 1014.

Figure 19:
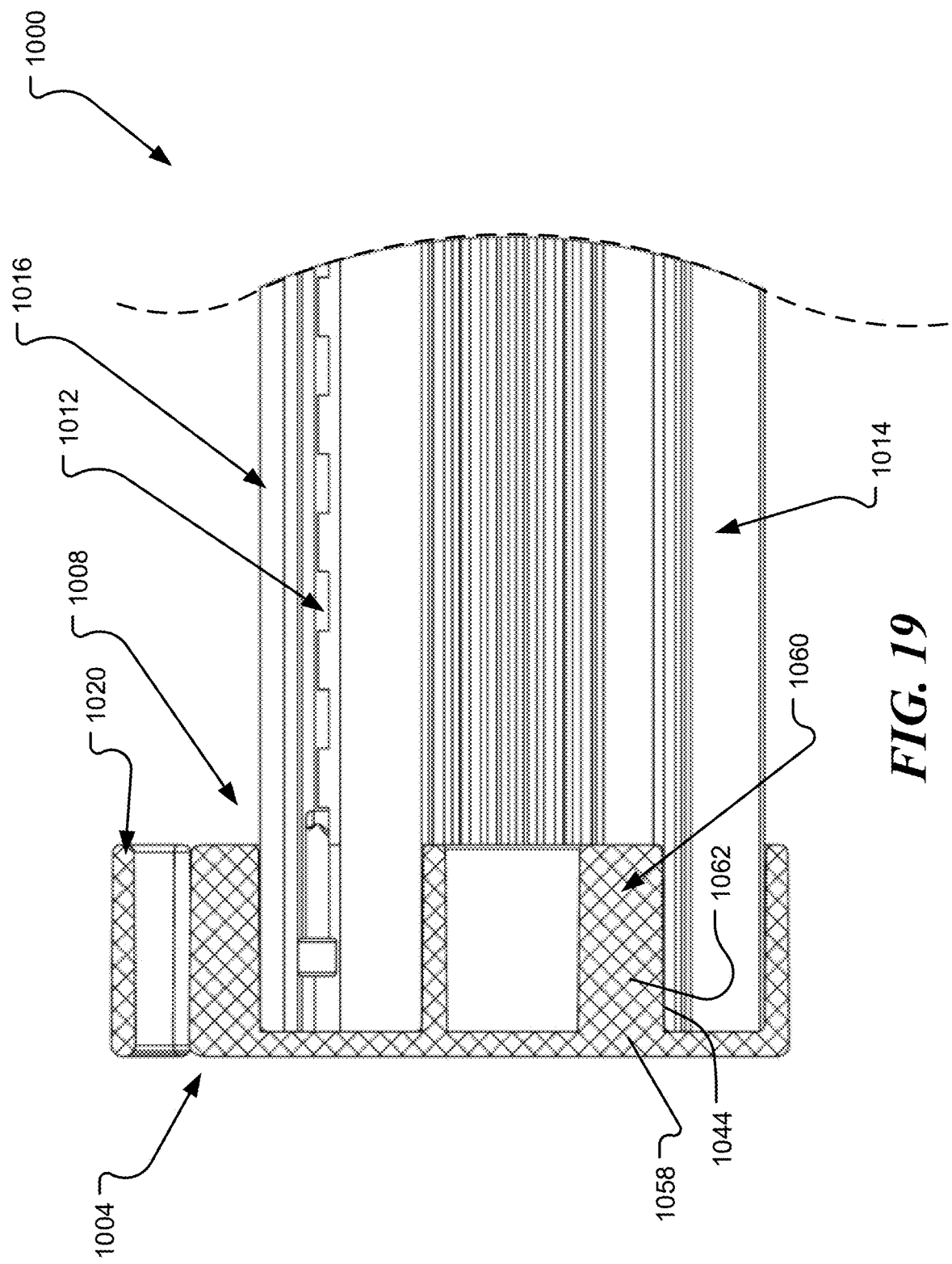
FIG. 19 is a cross-sectional side view of the end plug coupled to a terminal end of the lighting and support assembly.

In this way, as seen in FIG. 19, which is a longitudinal cross-sectional side view of the end plug 1004 coupled to a terminal end 1008 of the lighting and support assembly 1000, the end plug 1004 secures the cover 1016 and the heat sink 1014 together at the terminal end 1008 of the assembly 1000. The end wall 1058 provides a barrier for gas to within the lumen of the heat sink 1014. And as seen in the figure, there are no wire openings since this is the end of the line of LED strips. And as seen in FIG. 19, the inner surface 1044 of the heat sink 1014 abuts the central structure 1060 so as to seal the end 1008 of the lighting and support assembly 1000.

Figure 21:
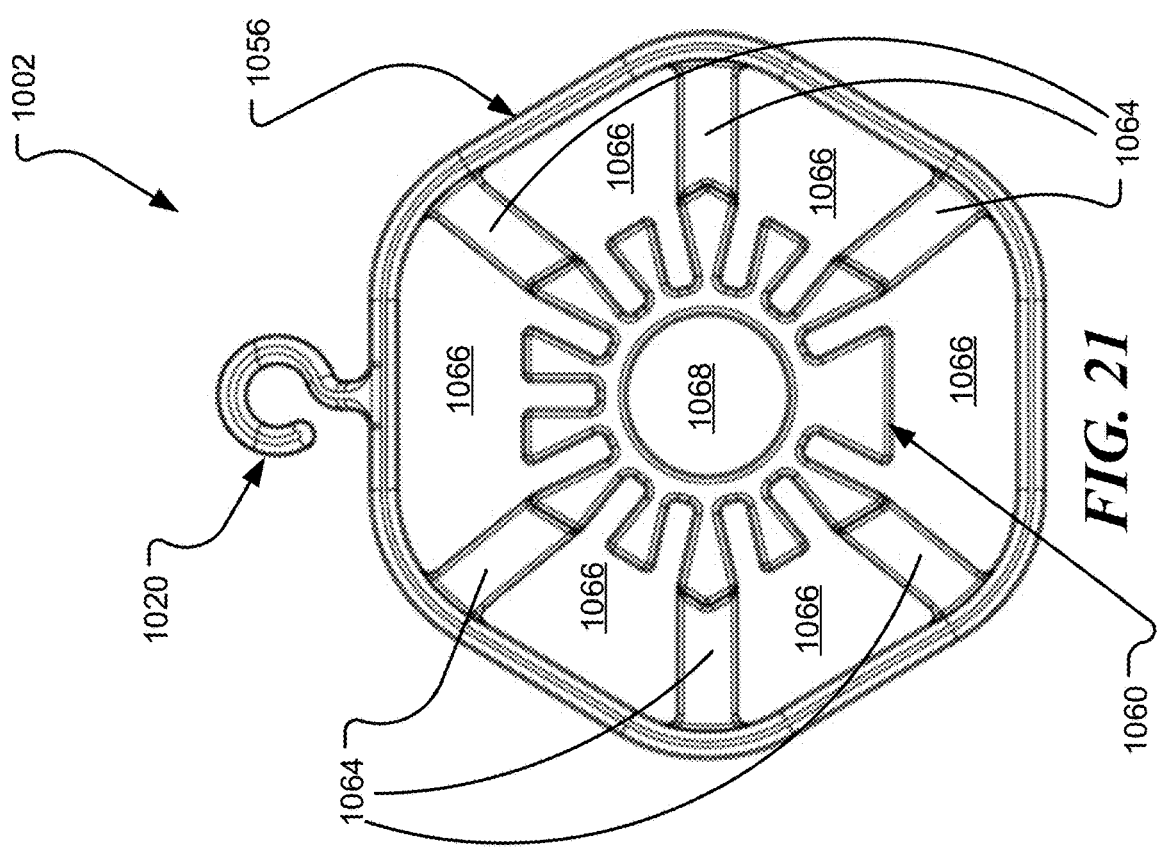
FIGS. 20 and 21 are, respectively, isometric and end views of a connector for coupling together a pair of lighting and support assemblies.
Figure 20:
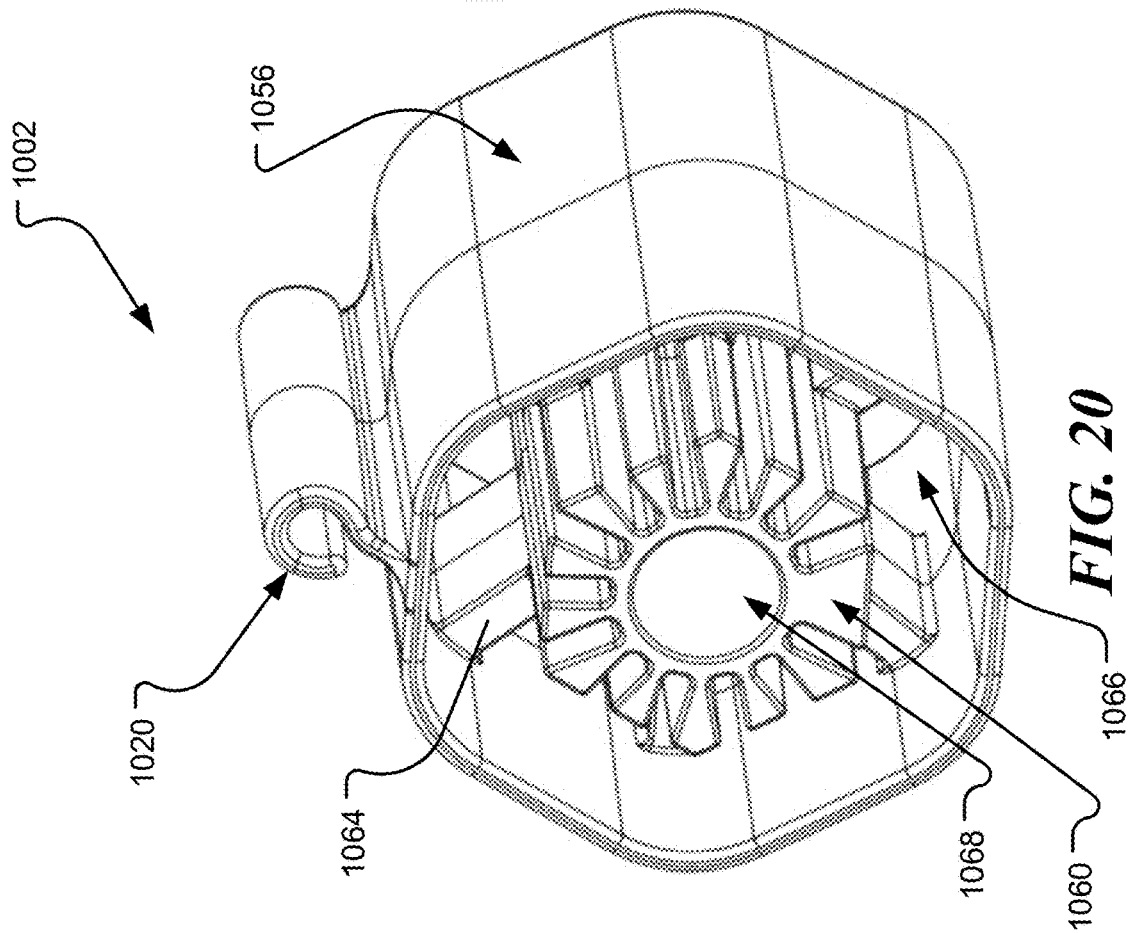

Reference is made to FIGS. 20 and 21, which are, respectively, isometric and end views of a connector 1002 for coupling together a pair of lighting and support assemblies 1000 (not shown in FIGS. 20 and 21). As seen in the figures, the connector 1002 includes a hexagonal body 1056 defined by six generally planar sections. The connector 1002 also include a hook 1020 at a top for coupling with a wire or suspension system. As seen in the figures, the connector 1002 includes a central structure 1060 that is coupled to and extends from the hexagonal body 1056 by six struts 1064. The six struts 1064 define passageways 1066 between the struts 1064, body 1056, and central structure 1060. The struts 1064 connect to the body 1056 at the curved sections that are positioned in between the planar sections of the hexagonal body 1056.

The peripheral passageways 1066 through the body 1056 provide paths for the electrical connectors 1022 of the LED strips 1012 and any other componentry that is linked between one lighting and support assembly 1000 to another. The central structure 1060 includes a plurality of fingers 1062 that are a negative shape of the fins 1048 projecting from the inner surface 1044 of the heat sink 1014. In this way, the plurality of fingers interdigitate with the fins 1048 projecting from the inner surface 1044 of the heat sink 1014. As seen in the figures, an outer surface of the structure 1060 is hexagonal shaped in order to match the inner shape of the inner surface 1044 of the heat sink 1014. The central structure 1060 further includes a passageway 1068 formed centrally in the structure 1060. The passageway 1068 permits fluid (e.g., gas) to pass from one heat sink 1014 to the next 1014.

Figure 22:
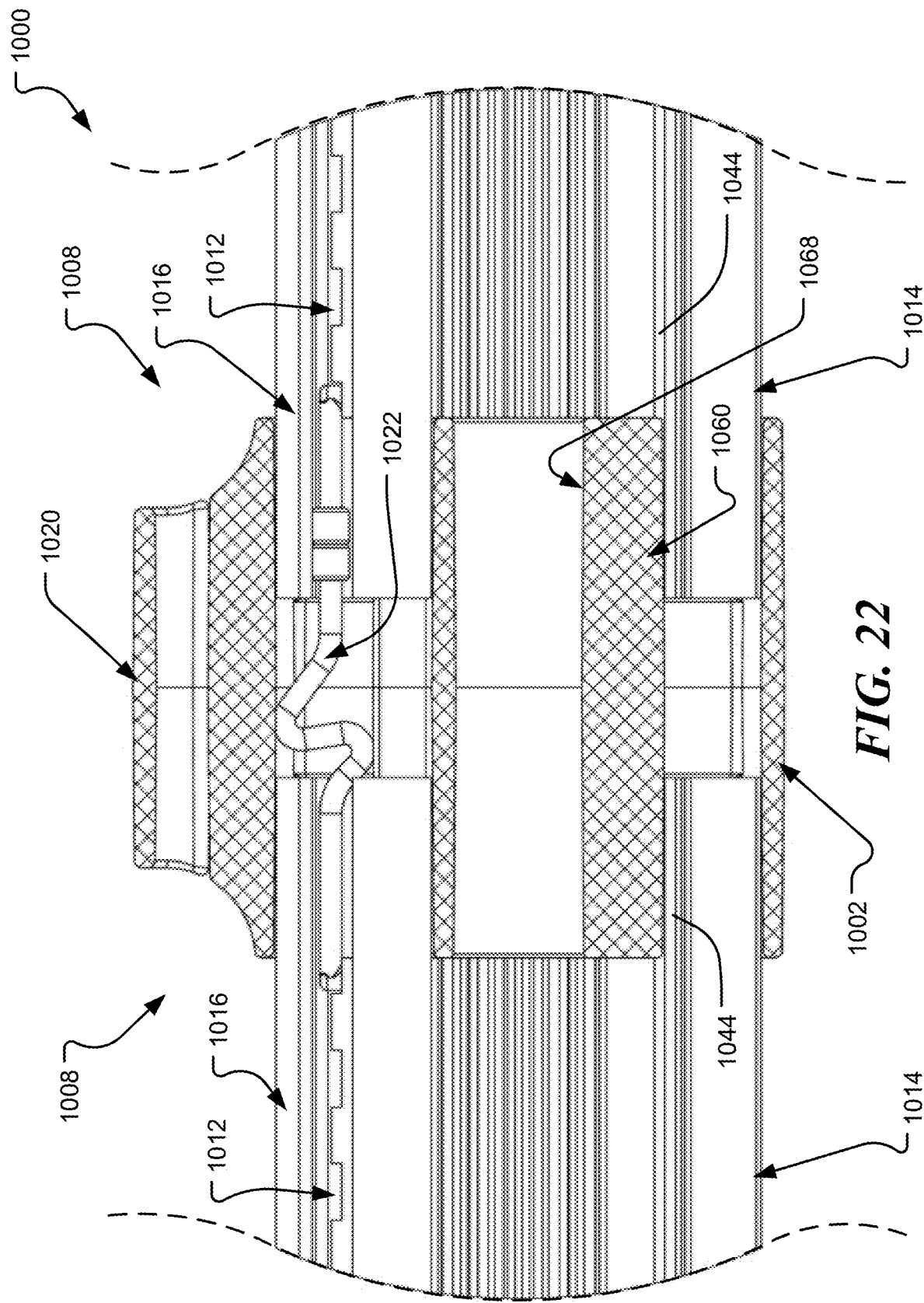
FIG. 22 is a cross-sectional side view of the connector coupling together a pair of lighting and support assemblies.

As seen in FIG. 22, which is a longitudinal cross-sectional side view of the connector 1002 coupling together a pair of lighting and support assemblies 1000, the connector 1002 secures the covers 1016 and the heat sinks 1014 of the assemblies 1000 together at the inner ends 1008 of the assemblies 1000. The central passageway 1068 provides a passage for fluid to pass from one lumen of the heat sink 1014 to the other. And as seen in the figure, the two LED strips 1012 are connected via the wires 1022 that extend through the top most passageway 1066 extending through the connector 1002. It is understood that the longitudinal cross-sectional side view of FIG. 22 only depicts the LED strips 1012 at the top and center of the assemblies 1000; but, there are two other LED strips 1012 on each of the assemblies 1000. The respective wires of those LED strips 1012 are passed through the passageways 1066 on either side of the passageway 1066 shown in FIG. 22. And as seen in FIG. 22, the inner surface 1044 of the heat sink 1014 abuts the central structure 1060 so as to seal the end 1008 of the lighting and support assembly 1000.

The following are descriptions of exemplary systems and methods of illustrated and described in this application. Aspects of the present disclosure may include a trellis lighting system that includes at least one lighting and support assembly. The at least one lighting and support may include a cover, a heat sink, and at least one light emitting diode (LED) strip, as described herein. The cover permits light to pass there through and includes a body extending a first length. The body of the cover is bounded by a first longitudinal edge, a second longitudinal edge opposite the first longitudinal edge, a first side edge, a second side edge opposite the first side edge. These edges define the perimeter of the cover. The cover also includes an inner surface, and an outer surface opposite the inner surface. The heat sink is designed to couple to the cover. The heat sink includes a body extending a second length. The body includes an outer surface, an inner surface defining a lumen that extends through the body, a plurality of outer fins coupled to the outer surface, and a plurality of inner fins coupled to the inner surface. The at least one LED strip is sized and shaped to be coupled to the body of the heat sink along the second length thereof so as to dissipate heat generated by the at least one LED strip. In an assembled state of the at least one lighting and support assembly, the at least one LED strip is positioned between the beat sink and the cover, and the plurality of outer fins are uncovered by the cover.

In certain instances, the assembled state of the at least one lighting and support assembly may be when the at least one LED strip is coupled to the heat sink, and the cover is coupled to the heat sink. This is in contrast to an unassembled state, when the cover is uncoupled to the heat sink, and the at least one LED strip is not coupled to the heat sink. The assembled state of the at least one lighting and support assembly, may also include an end cap, a connector, and an end cap coupled to the at least one lighting assembly.

An exemplary method of horticulture of a plant utilizing the trellis lighting system may include the following steps. The method may include a step of positioning a lighting strand assembly through an intra-canopy of the plant. In certain instances, the lighting strand assembly may include: at least one LED strip; a heat sink including an outer surface, a plurality of fins extending outward from the outer surface, a lumen extending longitudinally through the heat sink, and a plurality of gas ports extending from the lumen through the heat sink to the outer surface, the at least one LED strip coupled to the outer surface of the heat sink; and a cover coupled to the heat sink and covering the at least one LED strip, the cover not covering the plurality of fins of the heat sink. The method may further include a step of providing light to the intra-canopy of the plant via the at least one LED strip. The method may further include a step of providing fluid flow through the lumen of the heat sink, at least a portion of the fluid flow passing through the plurality of gas ports.

An exemplary heat sink for use in a lighting system, such as the trellis lighting system, may include a hexagonal body extending a length. The body may include an inner surface defining a lumen extending the length, first, second, third, fourth, fifth, and sixth body portions extending the length, the first, second, and third body portions may include planar surfaces extending the length, each of the first, second, and third body portions configured to support an LED strip thereon, the fourth, fifth, and sixth body portions including fins extending outward therefrom, the inner surface including a plurality of fins around a perimeter thereof.

Figure 23:
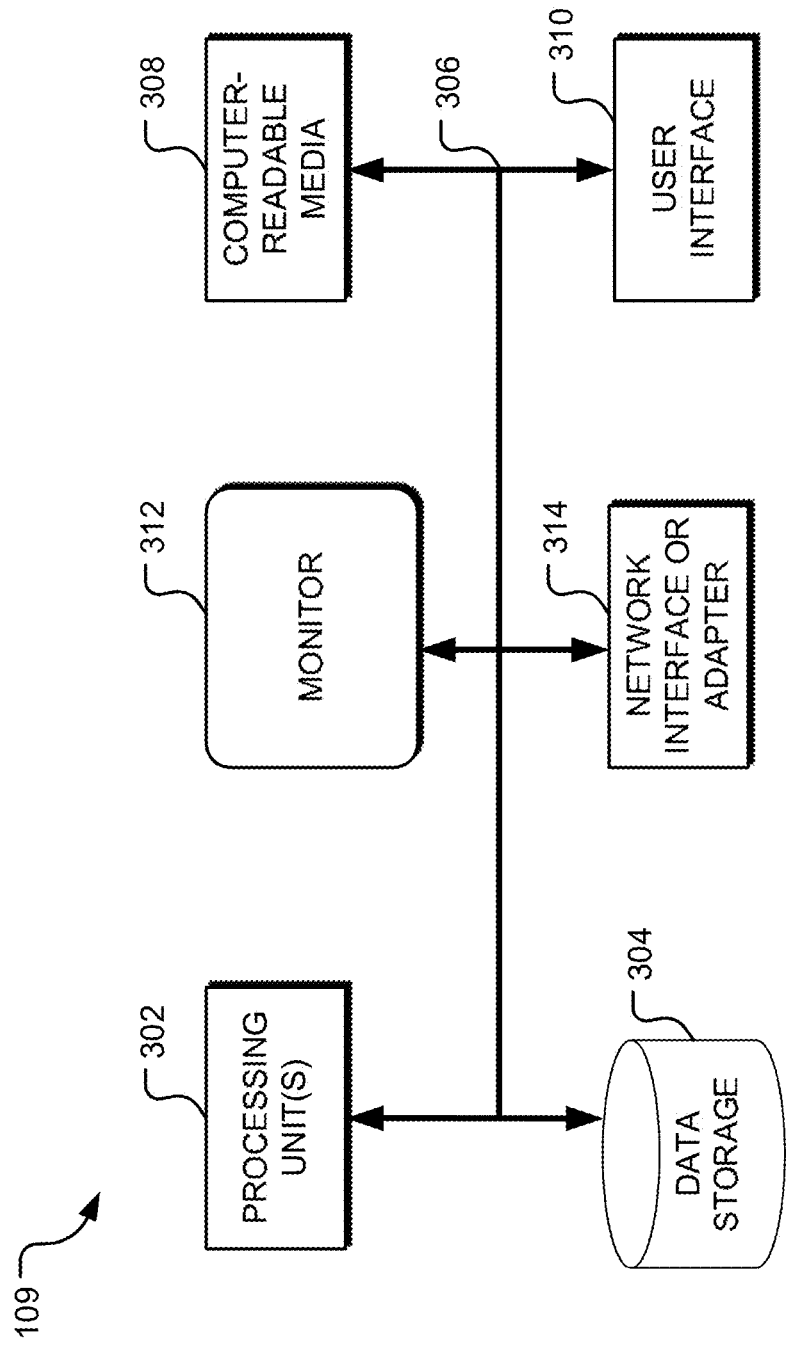
FIG. 23 is a diagram of an exemplary computing and network system for use with the trellis lighting system.

The following is a description of an exemplary computer 109 that is part of or useable with the trellis lighting system 100 described herein. FIG. 23 illustrates an example of a suitable computing and networking environment 109 that may be used to implement various aspects of the present disclosure described herein. As illustrated, the computing and networking environment 109 includes a general purpose computing device 109, although it is contemplated that the networking environment 109 may include other computing systems, such as smart phones, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 109 may include various hardware components, such as a processing unit 302, a data storage 304 (e.g., a system memory), and a system bus 306 that couples various system components of the computer 109 to the processing unit 302. The system bus 306 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 109 may further include a variety of computer-readable media 308 that includes removable/non-removable media and volatile/nonvolatile media, but excludes transitory propagated signals. Computer-readable media 308 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 109. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 304 includes computer storage media in the form of volatile/nonvolatile memory such as read only memory (ROM) and random access memory (RAM). A basic input/output system (BIOS), containing the basic routines that help to transfer information between elements within the computer 109 (e.g., during start-up) is typically stored in ROM. RAM typically contains data and/or program modules that are immediately accessible to and/or presently being operated on by processing unit 302. For example, in one embodiment, data storage 304 holds an operating system, application programs, and other program modules and program data.

Data storage 304 may also include other removable/non-removable, volatile/nonvolatile computer storage media. For example, data storage 304 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 23, provide storage of computer-readable instructions, data structures, program modules and other data for the computer 109.

A user may enter commands and information through a user interface 310 or other input devices such as a tablet, electronic digitizer, a microphone, keyboard, and/or pointing device, commonly referred to as mouse, trackball or touch pad. The commands and information may be for setting up the lighting and/or watering schedules, including the specific parameters of each. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 302 through a user interface 310 that is coupled to the system bus 306, but may be connected by other interface and bus structures, such as a parallel port, game port or a universal serial bus (USB). A monitor 312 or other type of display device is also connected to the system bus 306 via an interface, such as a video interface. The monitor 312 may also be integrated with a touch-screen panel or the like.

The computer 109 may operate in a networked or cloud-computing environment using logical connections of a network interface or adapter 314 to one or more remote devices, such as a remote computer. The remote computer may be a personal computer, a server, a router, a network PC, a peer device or other common network node, and typically includes many or all of the elements described above relative to the computer 109. The logical connections depicted in FIG. 23 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 109 may be connected to a public and/or private network through the network interface or adapter 314. In such embodiments, a modem or other means for establishing communications over the network is connected to the system bus 306 via the network interface or adapter 314 or other appropriate mechanism. A wireless networking component including an interface and antenna may be coupled through a suitable device such as an access point or peer computer to a network. In a networked environment, program modules depicted relative to the computer 109, or portions thereof, may be stored in the remote memory storage device.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A heat sink for use in a lighting assembly, the heat sink comprising:
   a hexagonal body extending a length and comprising an outer surface, an inner surface opposite the outer surface, a lumen defined by the inner surface, at least one hole extending through the hexagonal body from the inner surface to the outer surface, first, second, third, fourth, fifth, and sixth body portions extending the length, the first, second, and third body portions comprising planar surfaces extending the length, each of the first, second, and third body portions configured to support an LED strip thereon, the fourth, fifth, and sixth body portions including fins extending outward therefrom, the inner surface including a plurality of fins extending inward and positioned around a perimeter thereof; and
   a cover configured to be coupled to the hexagonal body such that the cover covers the first, second, and third body portions and does not cover the fourth, fifth, and sixth body portions.

2. The heat sink of claim 1, wherein the heat sink further comprises two protrusions extending at least a portion of the length and positioned on opposite sides of the hexagonal body, the two protrusions configured to couple with a cover configured to permit light from the LED strip to pass there through.

3. The heat sink of claim 1, wherein the at least one hole extends through at least one of the fourth, fifth, and sixth body portions.

4. The heat sink of claim 1, wherein the at least one hole extends through only the fifth body portion.

5. The heat sink of claim 1, wherein the at least one hole is positioned between a first pair of the plurality of fins on the inner surface and a second pair of the fins extending outward from the fifth body portion.

6. The heat sink of claim 1, wherein the hexagonal body further includes a plurality of curvate fins extending from the outer surface and at least a portion of the length.

7. The heat sink of claim 6, wherein the plurality of curvate fins include a first curvate fin and a second curvate fin, the first curvate fin extending outward from an intersection of the first and sixth body portions, the second curvate fin extending outward from an intersection of the third and fourth body portions.

8. The heat sink of claim 7, wherein the first curvate fin and second curvate fin are configured to secure a cover to the hexagonal body, the cover configured to permit light to pass therethrough.

9. The heat sink of claim 8, further comprising the cover.

10. The heat sink of claim 7, wherein the plurality of curvate fins further include a third curvate fin and a fourth curvate fin, the third curvate fin extending outward from an intersection of the first and second body portions, the fourth curvate fin extending outward from an intersection of the second and third body portions.

11. The heat sink of claim 1, further comprising an end structure configured to secure the hexagonal body and a cover together at one end, the end structure including an attachment structure for attaching to a suspension element.

12. The heat sink of claim 11, wherein the attachment structure is a hook.

13. The heat sink of claim 11, wherein the end structure includes at least one or both of a gas line opening and an electrical wire opening.

14. A heat sink for use in a lighting assembly, the heat sink comprising:

a polygonal body extending a length and comprising an outer surface, an inner surface opposite the outer surface, a lumen defined by the inner surface and a pair of openings at opposite ends thereof, at least one hole extending through the polygonal body from the inner surface to the outer surface, a first body segment extending the length, and a second body segment coupled to the first body segment and extending the length, the first body segment including planar portions on an outer surface thereof that are configured to support an LED strip thereon, the second body segment including fins extending outward therefrom, the inner surface of the polygonal body including a plurality of fins extending inward and positioned around a perimeter thereof; and a cover permitting light to pass therethrough, the cover configured to be coupled to the polygonal body such that the cover covers the first body segment and not the second body segment.

15. The heat sink of claim 14, wherein the first body segment comprises a first cross-sectional half of the polygonal body, and the second body segment comprises a second cross-sectional half of the polygonal body.

16. The heat sink of claim 15, wherein the polygonal body is a hexagonal body, the first body segment and the second body segment each comprises three planar body portions.

17. The heat sink of claim 14, wherein the polygonal body further includes a plurality of curvate fins extending outward from the outer surface and extending at least a portion of the length.

18. The heat sink of claim 17, wherein a pair of the plurality of curvate fins are configured to couple to the cover that permits light to pass therethrough.

* * * * *